(12) United States Patent
Yamane et al.

(10) Patent No.: US 12,287,275 B2
(45) Date of Patent: Apr. 29, 2025

(54) INFORMATION PROCESSING APPARATUS, PARTICLE SORTING SYSTEM, PROGRAM, AND PARTICLE SORTING METHOD

(71) Applicant: Sony Group Corporation, Tokyo (JP)

(72) Inventors: Kenji Yamane, Tokyo (JP); Shigeatsu Yoshioka, Kanagawa (JP); Yasunobu Kato, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 586 days.

(21) Appl. No.: 17/468,368

(22) Filed: Sep. 7, 2021

(65) Prior Publication Data

US 2021/0404940 A1     Dec. 30, 2021

Related U.S. Application Data

(63) Continuation of application No. 16/605,825, filed as application No. PCT/JP2018/010383 on Mar. 16, 2018, now Pat. No. 11,137,338.

(30) Foreign Application Priority Data

Apr. 24, 2017   (JP) ................................. 2017-085229

(51) Int. Cl.
  *G01N 15/14*   (2024.01)
  *G01N 15/1429*   (2024.01)
  (Continued)

(52) U.S. Cl.
  CPC ..... *G01N 15/1429* (2013.01); *G01N 15/1425* (2013.01); *G01N 15/1434* (2013.01);
  (Continued)

(58) Field of Classification Search
  CPC ........... G01N 15/1434; G01N 15/1425; G01N 15/1429; G01N 15/14; G01N 21/6428;
  (Continued)

(56) References Cited

U.S. PATENT DOCUMENTS 5,378,633 A   1/1995   von Behrens et al.
5,558,998 A   9/1996   Hammond et al.
              (Continued)

FOREIGN PATENT DOCUMENTS

EP   2426481 A1   3/2012
EP   2975384 A1   1/2016
              (Continued)

OTHER PUBLICATIONS

U.S. Appl. No. 16/605,825, filed Oct. 17, 2019, Yamane et al.
(Continued)

*Primary Examiner* — Sang H Nguyen
(74) *Attorney, Agent, or Firm* — Wolf, Greenfield & Sacks, P.C.

(57) ABSTRACT

To provide an information processing apparatus, a particle sorting system, a program, and a particle sorting method that practice a spectral type analysis usable for sorting particles. The information processing apparatus according to an aspect of the present technology includes: an analysis unit; a learning unit; and a discrimination unit. The analysis unit calculates fluorophore information indicating respective amounts of luminescence of a plurality of types of fluorophores on the basis of detection data indicating amounts of luminescence of fluorescence at respective wavelength bands, the fluorescence having been emitted from a particle irradiated with excitation light, discriminates whether or not to treat the particle as a process target in accordance with the fluorophore information, and generates teaching data by associating a result of the discrimination with the detection data. The learning unit applies a machine learning algorithm to the teaching data, learns a characteristic of the detection data discriminated as the process target, and generates dictionary data including a result of the learning. The discrimination unit discriminates whether or not the particle
(Continued)

whose detection data has been acquired is the process target on the basis of the dictionary data when the detection data is supplied.

15 Claims, 25 Drawing Sheets

(51) Int. Cl.
G01N 15/1434 (2024.01)
G01N 21/64 (2006.01)
G06N 20/00 (2019.01)
G01N 15/149 (2024.01)

(52) U.S. Cl.
CPC ......... *G01N 21/6428* (2013.01); *G06N 20/00* (2019.01); *G01N 15/149* (2024.01)

(58) Field of Classification Search
CPC ... G01N 21/64; G01N 2015/149; G06N 20/00
See application file for complete search history.

(56) References Cited

U.S. PATENT DOCUMENTS

| | | | |
|---|---|---|---|
| 6,813,017 B1 | 11/2004 | Hoffman et al. | |
| 7,299,135 B2 | 11/2007 | Thayer | |
| 9,528,925 B2* | 12/2016 | Kletter | G01N 15/1459 |
| 11,137,338 B2 | 10/2021 | Yamane et al. | |
| 2010/0280765 A1 | 11/2010 | Marquardt et al. | |
| 2010/0302536 A1* | 12/2010 | Ball | G01J 3/4406 |
| | | | 702/19 |
| 2011/0113046 A1 | 5/2011 | Isozu | |
| 2012/0056103 A1 | 3/2012 | Sakai | |
| 2013/0346023 A1 | 12/2013 | Novo et al. | |
| 2016/0011095 A1 | 1/2016 | Muraki | |
| 2017/0038299 A1 | 2/2017 | Long et al. | |
| 2017/0045436 A1* | 2/2017 | Fox | G01N 15/1434 |
| 2017/0140299 A1 | 5/2017 | Tanji | |
| 2018/0246027 A1 | 8/2018 | Vacca et al. | |
| 2018/0259440 A1 | 9/2018 | Otsuka | |
| 2020/0124520 A1 | 4/2020 | Yamane et al. | |

FOREIGN PATENT DOCUMENTS

| | | | |
|---|---|---|---|
| JP | 2007-132921 A | | 5/2007 |
| JP | 2008-128982 A | | 6/2008 |
| JP | 2012-052985 A | | 3/2012 |
| JP | WO 2014/141878 A1 | | 9/2014 |
| JP | 22016-028229 A | | 2/2016 |
| JP | 2016-511397 A | | 4/2016 |
| JP | 2017-049677 A | | 3/2017 |
| JP | 2017-058361 A | | 3/2017 |
| WO | WO 1998/029833 A1 | | 7/1998 |
| WO | WO 2016/006203 A1 | | 1/2016 |
| WO | WO 2017/046988 A1 | | 3/2017 |
| WO | WO-2018198586 A1 | | 11/2018 |

OTHER PUBLICATIONS

International Search Report and English translation thereof mailed Jun. 19, 2018 in connection with International Application No. PCT/JP2018/010383.
Extended European Search Report issued Apr. 9, 2020 in connection with European Application No. 18790818.1.
Written Opinion and English translation thereof mailed Jun. 19, 2018 in connection with International Application No. PCT/JP2018/010383.
International Preliminary Report on Patentability and English translation thereof mailed Nov. 7, 2019 in connection with International Application No. PCT/JP2018/010383.

* cited by examiner

| Cell number | PMT1 | PMT2 | ... | PMT10 |
|---|---|---|---|---|
| 1 | 10 | 20 | ... | 20 |
| 2 | 1 | 2 | ... | 10 |
| 3 | 0 | 1000 | ... | 1000 |

FIG.5

| Cell number | PMT1 | PMT2 | ... | PMT10 | Process target |
|---|---|---|---|---|---|
| 1 | 10 | 20 | ... | 20 | N |
| 2 | 1 | 2 | ... | 10 | N |
| 3 | 0 | 1000 | ... | 1000 | Y |

FIG.10

| Margin information | Margin |
|---|---|
| Mode 1 | +10% |
| Mode 2 | +20% |
| Mode 3 | −30% |

| Learning time mode | Algorithm |
|---|---|
| Mode 1 | RandomForest |
| Mode 2 | Support vector machine |
| Mode 3 | Logistic regression |

| Fluorophore | PMT1 | PMT2 | ... | PMT10 |
|---|---|---|---|---|
| Dye 1 | 1 | 0.5 | ... | 0 |
| Dye 2 | 1 | 0.7 | ... | 0 |
| ... | | | ... | |
| Dye N | 0.1 | 1 | ... | 0 |

FIG.23

| Cell number | PMT1 | ... | PMT10 | Synthetic variable 1 | ... | Synthetic variable 10*N | Process target |
|---|---|---|---|---|---|---|---|
| 1 | 10 | ... | 20 | 0.1 | ... | 20 | N |
| 2 | 1 | ... | 10 | 1 | ... | 2 | N |
| 3 | 0 | ... | 1000 | 0 | ... | 1 | Y |

FIG.25

INFORMATION PROCESSING APPARATUS, PARTICLE SORTING SYSTEM, PROGRAM, AND PARTICLE SORTING METHOD

CROSS-REFERENCE TO RELATED APPLICATIONS

The present application claims the benefit under 35 U.S.C. § 120 as a continuation application of U.S. application Ser. No. 16/605,825, filed on Oct. 17, 2019, now U.S. Pat. No. 11,137,338, which claims the benefit under 35 U.S.C. § 371 as a U.S. National Stage Entry of International Application No. PCT/JP2018/010383, filed in the Japanese Patent Office as a Receiving Office on Mar. 16, 2018, which claims priority to Japanese Patent Application Number JP2017-085229, filed in the Japanese Patent Office on Apr. 24, 2017, each of which applications is hereby incorporated by reference in its entirety.

TECHNICAL FIELD

The present technology relates to an information processing apparatus, a particle sorting system, a program, and a particle sorting method with regard to flow cytometry.

BACKGROUND ART

The flow cytometry is a method of flowing a liquid including dispersed particles in a manner that the particles form a line, detecting fluorescence emitted from the particles irradiated with excitation light, and analyzing the particles. This method is often used for analysis of a cell or the like bound to a fluorophore. In addition, according to the flow cytometry, it is also possible to electrically charge droplets including the particles, change paths of the droplets through deflection plates, and sort the particles in accordance with analysis results.

Conventionally, a method of emitting excitation light having a plurality of types of different wavelength bands to the particles, dispersing fluorescence, and making a detection through a plurality of photomultiplier tubes (PMTs) is commonly used. A detection target of each of the PMTs is fluorescence emitted from a specific fluorophore.

In recent years, spectral type analysis methods have been developed. Such a spectral type analysis method uses reference spectra of respective fluorophores, performs unmixing calculation of measured fluorescence spectra, and calculates respective amounts of fluorophores in real time. Clustering analysis or the like is often used as the method of analyzing fluorescence spectra (for example, Patent Literature 1 and Patent Literature 2).

CITATION LIST

Patent Literature

Patent Literature 1: JP 2007-132921A
Patent Literature 2: JP 2016-511397A

DISCLOSURE OF INVENTION

Technical Problem

According to the spectral type analysis method, it is possible to accurately analyze fluorescence by high wavelength resolution. However, the spectral type analysis method uses a large computation amount, and needs time to make an analysis. Accordingly, although such a spectral type analysis method can be used for analyzing fluorescence after the flow cytometry is completed, this is not suitable for analyzing fluorescence of particles, using a result of the analysis, and sorting the particles because the computation process does not finish in time. Therefore, it is impossible to practice such a utilization method.

In view of the circumstances as described above, a purpose of the present technology is to provide an information processing apparatus, a particle sorting system, a program, and a particle sorting method that practice the spectral type analysis usable for sorting particles.

Solution to Problem

To achieve the above-described purpose, an information processing apparatus according to an aspect of the present technology includes: an analysis unit; a learning unit; and a discrimination unit.

The analysis unit calculates fluorophore information indicating respective amounts of luminescence of a plurality of types of fluorophores on the basis of detection data indicating amounts of luminescence of fluorescence at respective wavelength bands, the fluorescence having been emitted from a particle irradiated with excitation light, discriminates whether or not to treat the particle as a process target in accordance with the fluorophore information, and generates teaching data by associating a result of the discrimination with the detection data.

The learning unit applies a machine learning algorithm to the teaching data, learns a characteristic of the detection data discriminated as the process target, and generates dictionary data including a result of the learning.

The discrimination unit discriminates whether or not the particle whose detection data has been acquired is the process target on the basis of the dictionary data when the detection data is supplied.

The information processing apparatus operates in two phases including a learning phase and a sorting phase. In the learning phase, the analysis unit calculates fluorophore information from detection data obtained through detection with regard to particles, and discriminates whether or not the particles are process targets (such as sorting targets) by using the fluorophore information. The learning unit learns what kind of detection data is obtained from process target particles (whether the fluorophore information calculated from the detection data satisfies a predetermined condition) through machine learning. In the sorting phase, the discrimination unit uses this learning result and discriminates whether the supplied detection data is come from the process target particles. By using the learning result of the learning unit, the discrimination unit is capable of discriminating the process target particles without calculating the fluorophore information. A relatively large amount of computation is necessary to calculate the fluorophore information from the detection data. However, the discrimination unit does not have to perform such calculation in the sorting phase. In addition, the discrimination section is capable of discriminating particle immediately after the detection data is supplied. This makes it possible to sort the particles immediately after fluorescence is detected in the sorting phase. Therefore, it is possible to apply, to the flow cytometry, the spectral type analysis method that needs calculation of fluorophore information.

The analysis unit may calculate the fluorophore information through a weighted least-square method.

The weighted least-square method (WLSM) is a computation method of calculating fluorophore information from detection data, and is capable of accurately calculating the fluorophore information. Although this computation needs time, it is not necessary for the discrimination unit to calculate fluorophore information according to the present technology as described above. Therefore, this is favorably applicable to a case where fluorophore information is calculated from detection data obtained by the analysis unit.

The analysis unit may set process target ranges with regard to the respective amounts of luminescence of the plurality of types of fluorophores, and discriminate whether or not to treat the particle as the process target in accordance with whether or not the fluorophore information is included in the process target range.

The information processing apparatus may further include a margin designation unit that designates a margin of the process target range.

In the case where the fluorophore information is included in the process target range, it is discriminated that detection data from which the fluorophore information has been calculated is data detected from process target particles. Here, in the case where the fluorophore information is positioned near a boundary of the process target range, this may affect discrimination accuracy and therefore machine learning accuracy. Accordingly, it is possible to improve the machine learning accuracy when the margin designation unit enlarges or reduces the process target range.

The information processing apparatus may further include a learning time designation unit that designates the machine learning algorithm to be used by the learning unit.

The information processing apparatus according to the present technology sorts particles in the sorting phase by using the learning result obtained in the learning phase. However, sometimes it is necessary to shorten time required for the learning phase and the sorting phase, in order to prevent reduction or the like in reactivity of a binding reaction between a cell and a fluorescent label. The learning time designation unit is capable of adjusting the required time by designating a machine learning algorithm.

The information processing apparatus may further include a synthetic variable generation unit that generates a synthetic variable on the basis of the detection data and reference spectra that are respective luminescence spectra of the plurality of types of fluorophores.

The analysis unit generates the teaching data by associating the synthetic variable with the detection data together with the result of the discrimination.

The discrimination unit discriminates whether or not the particle whose detection data has been acquired is the process target on the basis of the dictionary data and the synthetic variable.

When the analysis unit treats a synthetic variable as teaching data in addition to a result of discrimination, an amount of characteristics to be used for the machine learning is increased. This makes it possible to improve accuracy of the machine learning in the learning phase and accuracy of the discrimination in the sorting phase.

The particle may be a cell fluorescently labeled with the plurality of types of fluorophores.

The information processing apparatus according to the present technology is favorably usable for detecting fluorescence with regard to fluorescently labeled cells and sorting the cells in accordance with results of detection.

To achieve the above-described purpose, a particle sorting system according to an aspect of the present technology includes: an excitation light emission unit; a fluorescence detection unit; an analysis unit; a learning unit; and a discrimination unit.

The excitation light emission unit emits excitation light to a liquid including a particle.

The fluorescence detection unit includes a detector that disperses fluorescence emitted from the particle irradiated with the excitation light, detects amounts of luminescence of the fluorescence at respective wavelength bands, and generates detection data.

The analysis unit calculates fluorophore information indicating respective amounts of luminescence of a plurality of types of fluorophores on the basis of the detection data, discriminates whether or not to treat the particle as a process target in accordance with the fluorophore information, and generates teaching data by associating a result of the discrimination with the detection data.

The learning unit applies a machine learning algorithm to the teaching data, learns a characteristic of the detection data discriminated as the process target, and generates dictionary data including a result of the learning.

The discrimination unit discriminates whether or not the particle whose detection data has been acquired is the process target on the basis of the dictionary data when the detection data is supplied.

The particle sorting system may further include a particle sorting mechanism that sorts the particle on the basis of a result of the discrimination made by the discrimination unit.

The particle sorting mechanism may generate a droplet including the particle, control a path of the droplet by electrically charging the droplet, and sort the particle.

To achieve the above-described purpose, a program according to an aspect of the present technology causes an information processing apparatus to function as: an analysis unit; a learning unit; and a discrimination unit.

The analysis unit calculates fluorophore information indicating respective amounts of luminescence of a plurality of types of fluorophores on the basis of detection data indicating amounts of luminescence of fluorescence at respective wavelength bands, the fluorescence having been emitted from a particle irradiated with excitation light, discriminates whether or not to treat the particle as a process target in accordance with the fluorophore information, and generates teaching data by associating a result of the discrimination with the detection data.

The learning unit applies a machine learning algorithm to the teaching data, learns a characteristic of the detection data discriminated as the process target, and generates dictionary data including a result of the learning.

The discrimination unit discriminates whether or not the particle whose detection data has been acquired is the process target on the basis of the dictionary data when the detection data is supplied.

To achieve the above-described purpose, in a particle sorting method according to an aspect of the present technology, an analysis unit calculates fluorophore information indicating respective amounts of luminescence of a plurality of types of fluorophores on the basis of detection data indicating amounts of luminescence of fluorescence at respective wavelength bands, the fluorescence having been emitted from a particle irradiated with excitation light, discriminates whether or not to treat the particle as a process target in accordance with the fluorophore information, and generates teaching data by associating a result of the discrimination with the detection data.

The learning unit applies a machine learning algorithm to the teaching data, learns a characteristic of the detection data discriminated as the process target, and generates dictionary data including a result of the learning.

The discrimination unit discriminates whether or not the particle whose detection data has been acquired is the process target on the basis of the dictionary data when the detection data is supplied.

Advantageous Effects of Invention

As described above, according to the present technology, it is possible to provide the information processing apparatus, the particle sorting system, the program, and the particle sorting method that practice the spectral type analysis that is usable for sorting particles. Note that, the effects described herein are not necessarily limited and may be any of the effects described in the present disclosure.

BRIEF DESCRIPTION OF DRAWINGS

FIG. 5 illustrates an example of PMT data acquired by an input unit of the information processing apparatus.

FIG. 10 illustrates an example of teaching data generated by the analysis unit of the information processing apparatus.

FIG. 23 illustrates an example of reference spectra of respective fluorophores stored in a reference spectrum database of the information processing apparatus.

FIG. 25 illustrates an example of teaching data generated by an analysis unit of the information processing apparatus.

MODE(S) FOR CARRYING OUT THE INVENTION

First Embodiment

A particle sorting system according to a first embodiment of the present technology will be described.
[Configuration of Particle Sorting System]

Figure 1:
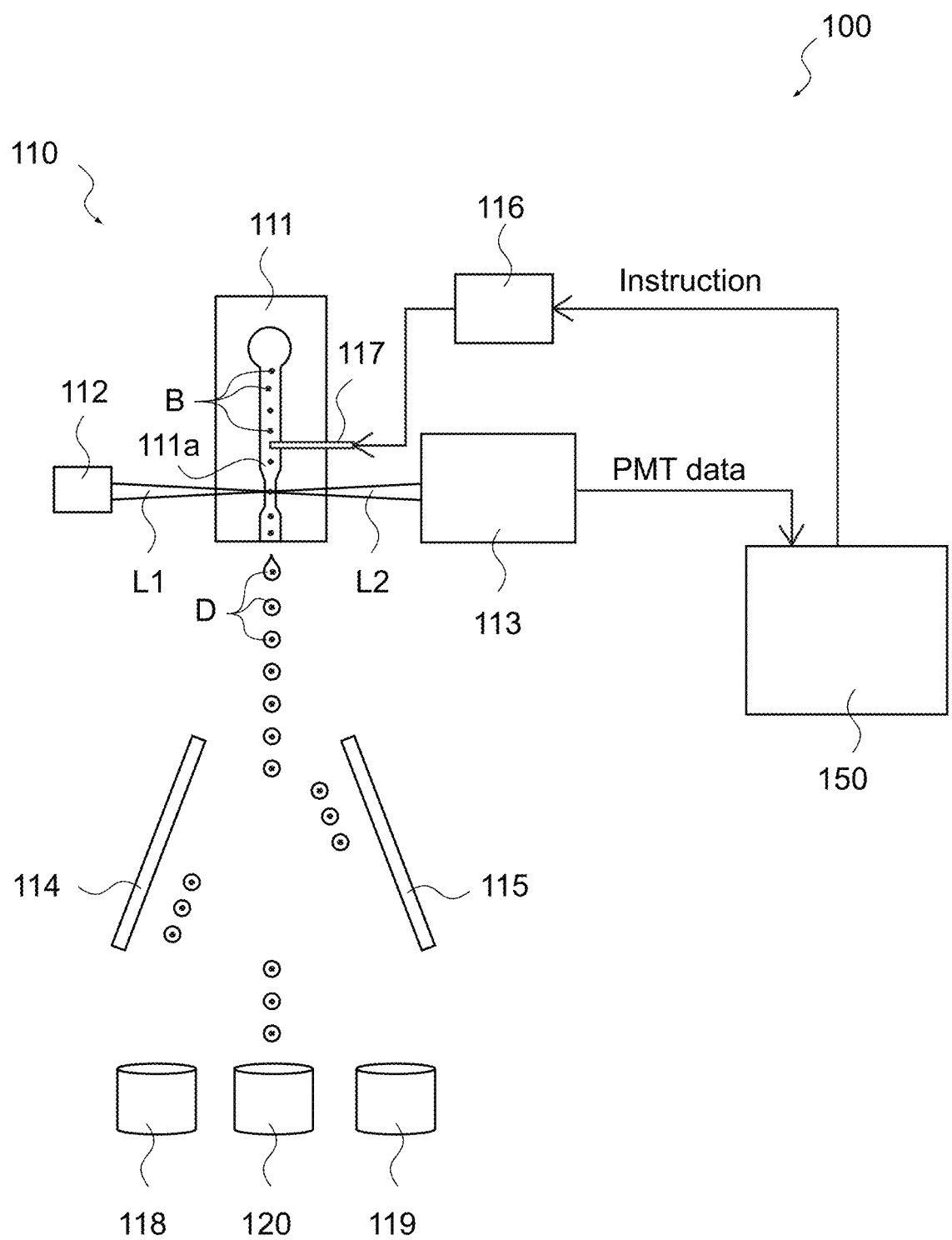
FIG. 1 is a schematic diagram illustrating a particle sorting system according to a first embodiment of the present technology.

FIG. 1 is a schematic diagram illustrating a configuration of a particle sorting system 100 according to this embodiment. As illustrated in FIG. 1, the particle sorting system 100 includes a flow cytometer 110 and an information processing apparatus 150.
[Configuration and Operation of Flow Cytometer]

The flow cytometer 110 includes a sorting chip 111, an excitation light emission unit 112, a fluorescence detection unit 113, a deflection plate 114, a deflection plate 115, a control unit 116, and an electrode 117.

To the flow cytometer 110, a liquid including process target particles (hereinafter, referred to as a particle-including liquid) is supplied. For example, the particle-including liquid is obtained by mixing a sample liquid including particles and a sheath liquid for carrying the particles. For example, the process target particles are cells labeled with fluorophores.

The sorting chip 111 discharges droplets (D in FIG. 1) of the particle-including liquid. The sorting chip 111 includes a flow channel 111a through which the particle-including liquid flows. The flow channel 111a is configured in a manner that the particles (B in FIG. 1) flow in line.

The flow channel 111a is provided with an electrode 117 that makes electrical contacts with the particle-including liquid. In addition, the sorting chip 111 is connected to a vibration element (not illustrated) that vibrates the sorting chip 111. When the vibration elements vibrates the sorting chip 111, the particle-including liquid becomes the droplets D and is discharged from the flow channel 111a.

The excitation light emission unit 112 includes an optical system and a light source for generating excitation light, and emits the excitation light (L1 in FIG. 1) to the particle-including liquid flowing through the flow channel 111a. For example, the excitation light is laser light. It is also possible to install a plurality of the excitation light emission units 112. The plurality of the excitation light emission units 112 may be configured to emit a plurality of beams of excitation light having different wavelengths.

The fluorescence detection unit 113 detects fluorescence (L2 in FIG. 1) emitted from a particle irradiated with the excitation light. The configuration of the fluorescence detection unit 113 will be described later. The fluorescence detection unit 113 outputs PMT data to the information processing apparatus 150. The PMT data is a fluorescence detection result.

The deflection plate 114 and the deflection plate 115 are connected to a power source (not illustrated), and are configured to be chargeable positively or negatively.

The control unit 116 controls the respective components of the flow cytometer 110 in response to an instruction from the information processing apparatus 150, and causes the flow cytometer 110 to sort the particles. Specifically, for example, the control unit 116 performs control in a manner that the sorting chip 111 is vibrated, the droplets D are formed, and electric charge is generated. The electric charge is to be supplied to the electrode 117.

The flow cytometer 110 is configured as described above. When the particle-including liquid is supplied to the sorting chip 111, the particle-including liquid flows through the flow channel 111a. When the excitation light emission unit 112 emits the excitation light L1 to the flow channel 111a and the excitation light L1 reaches the particles B, fluorophores bound to the particles B produce fluorescence, and the fluorescence L2 is emitted from the particles B.

The fluorescence L2 is incident on the fluorescence detection unit 113. As described later, the fluorescence detection unit 113 detects and disperses the fluorescence, and generates PMT data. The fluorescence detection unit 113 outputs the generated PMT data to the information processing apparatus 150.

The control unit 116 generates electric charge in response to an instruction from the information processing apparatus 150, and electrically charges the particle-including liquid flowing through the flow channel 111a via the electrode 117. In addition, the control unit 116 controls a vibration mechanism included in the sorting chip 11 in a manner that vibration is generated and each of the droplets D includes one of the particles B. The droplets D pass through a gap between the deflection plate 114 and the deflection plate 115 while maintaining the same electric charge as the particle-including liquid passed through the flow channel 111a at a time of forming the droplets.

The droplets D passing through the gap between the deflection plate 114 and the deflection plate 115 are deflected by the deflection plate 114 and the deflection plate 115. For example, when the deflection plate 114 is positively charged and the deflection plate 115 is negatively charged, a negatively charged droplet D is drawn by the deflection plate 114 and is stored in a container 118. In addition, a positively charged droplet D is drawn by the deflection plate 115, and is stored in a container 119. An uncharged droplet proceeds without being deflected by the deflection plate 114 or the deflection plate 115, and is stored in a container 120.

At a timing immediately before the droplets D are discharged, the control unit 116 supplies electric charge to the electrode 117, charges the droplets D positively or negatively, or uncharges the droplets D. This makes it possible to control the paths of the droplets D. Therefore, it is possible to store, that is, sorts the particles B into any of the containers together with the droplets D.

Here, the information processing apparatus 150 discriminates whether or not the particles from which the fluorescence has been detected are process targets on the basis of the PMT data, and issues an instruction to the control unit 116 in accordance with a result of the discrimination. Therefore, it is necessary for the information processing apparatus 150 to discriminate whether or not a particle from which fluorescence has been detected is a process target in time between when the fluorescence has been detected and when the droplet including the particle have been formed. Therefore, a quick discrimination process is necessary.

Note that, the configuration of the flow cytometer 110 is not limited thereto. It is sufficient to configure the flow cytometer 110 in a manner that the flow cytometer 110 is capable of detecting fluorescence of particles, outputting PMT data to the information processing apparatus 150, and sorting the particles under the control of the information processing apparatus 150.

[Configuration of Fluorescence Detection Unit]

Figure 2:
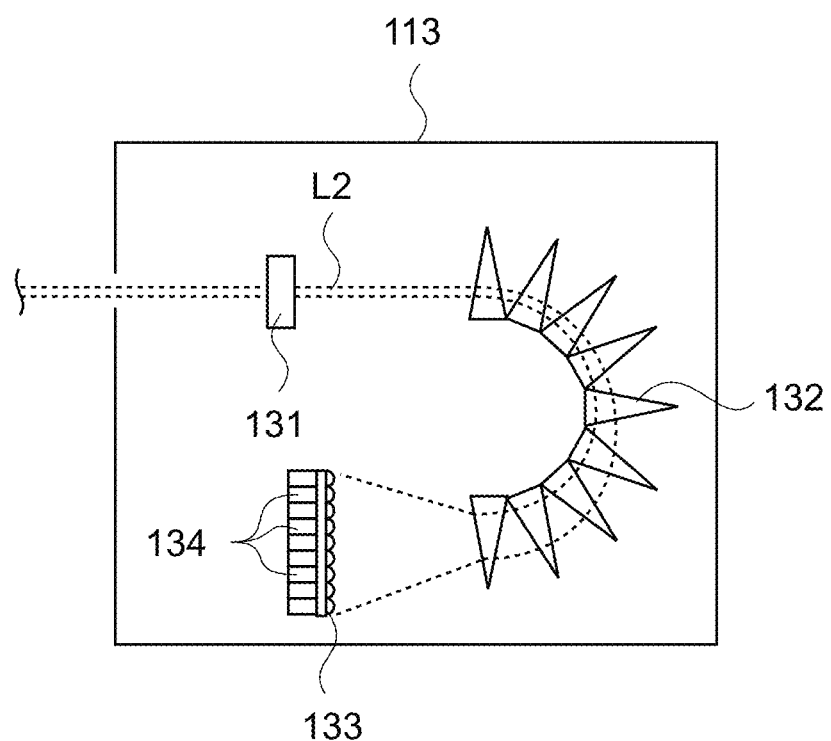
FIG. 2 is a schematic diagram illustrating a fluorescence detection unit included in the particle sorting system.

FIG. 2 is a schematic diagram illustrating a configuration of the fluorescence detection unit 113. As illustrated in FIG. 2, the fluorescence detection unit 113 includes an optical system 131, a prism array 132, a microlens array 133, and photomultiplier tubes (PMTs) 134.

The optical system 131 causes the fluorescence L2 emitted from the particles to enter the prism array 132. The configuration of the optical system 131 is not specifically limited.

The prism array 132 includes many prisms. The prism array 132 disperses the fluorescence L2 emitted from the optical system 131, into respective wavelengths.

The microlens array 133 is an array of microlenses that causes the dispersed fluorescence to enter the respective PMTs 134.

The PMT 134 converts incident light into an electric signal and outputs the electric signal. The fluorescence detection unit 113 includes many PMTs 134. The number of PMTs is not specifically limited. For example, the number of PMTs may be 66 (66 channels).

The fluorescence detection unit 113 is configured as described above. The fluorescence L2 emitted from a particle is dispersed by the prism lens array into respective wavelengths, and the dispersed fluorescence at the respective wavelength bands is incident on the PMTs 134. In other words, in the fluorescence detection unit 113, the respective PMTs 134 detect amounts of luminescence of the fluorescence L2 at respective wavelengths.

Figure 3:
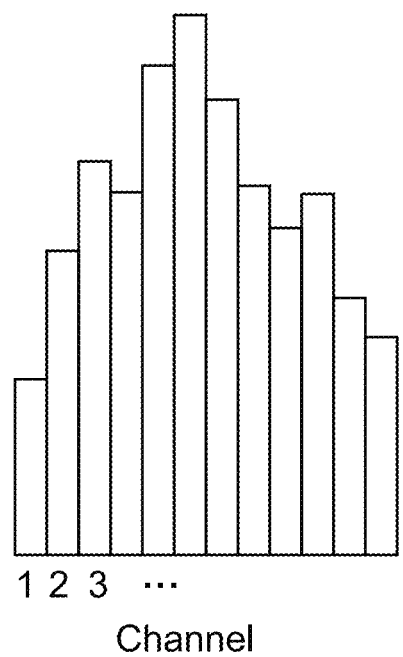
FIG. 3 illustrates an example of PMT data output from the fluorescence detection unit included in the particle sorting system.

FIG. 3 illustrates an example of the amounts of luminescence detected by the respective PMTs 134 with regard to a single particle. Outputs from the respective PMTs 134 are referred to as channels. Each time a new particle is irradiated with excitation light and produces fluorescence, the fluorescence detection unit 113 detects the fluorescence by using the PMTs 134 and generates output values of the respective PMTs 134 (hereinafter, also referred to as PMT data) as illustrated in FIG. 3.

[Configuration of Information Processing Apparatus]

Figure 4:
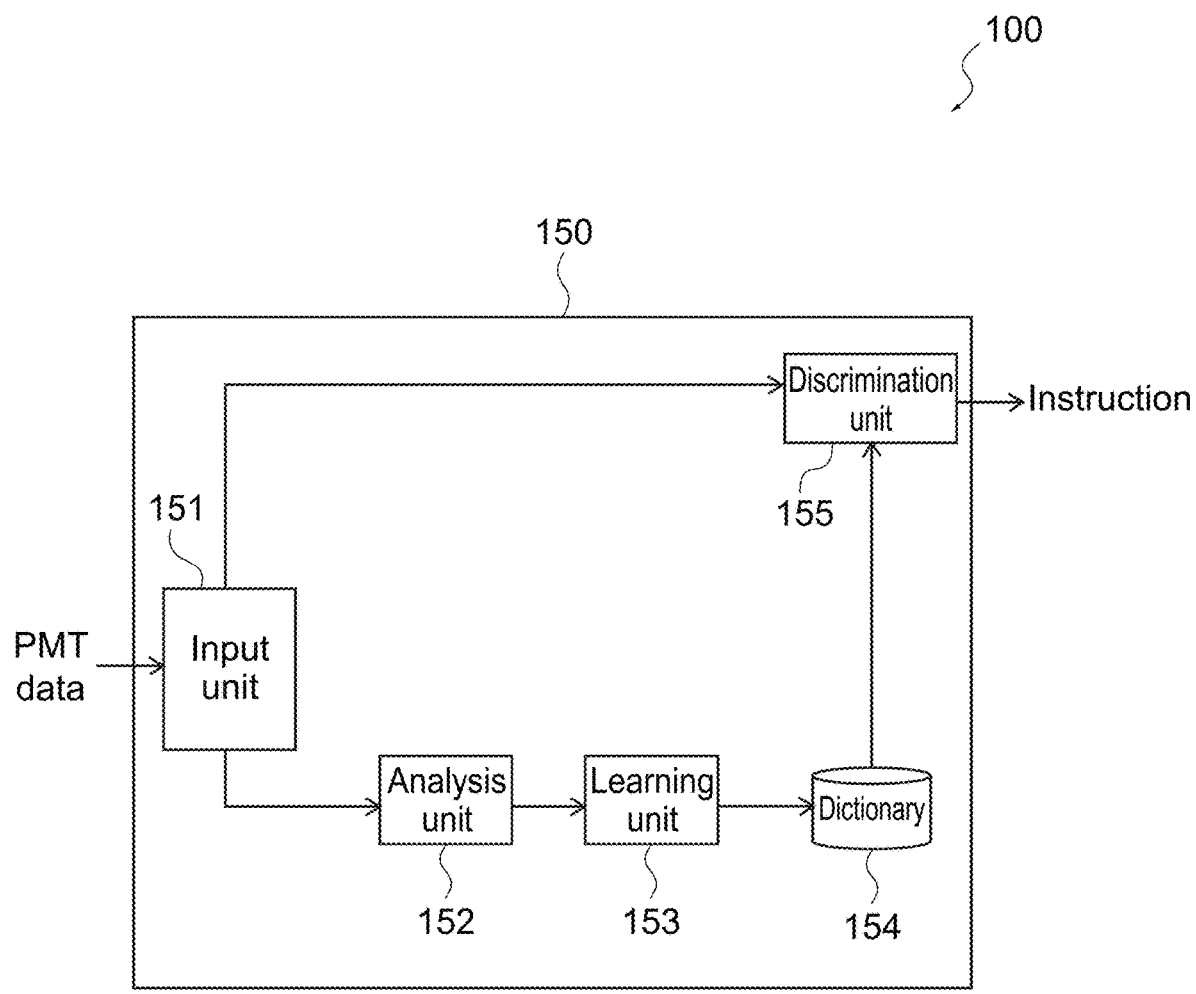
FIG. 4 is a block diagram illustrating an information processing apparatus included in the particle sorting system.

FIG. 4 is a block diagram illustrating a functional configuration of the information processing apparatus 150. As illustrated in FIG. 4, the information processing apparatus 150 includes an input unit 151, an analysis unit 152, a learning unit 153, a dictionary 154, and a discrimination unit 155. Note that, hereinafter, a process target particle is assumed to be a cell labeled with a fluorophore.

The input unit 151 acquires PMT data from the PMTs 134 in the flow cytometer 110. FIG. 5 illustrates an example of the PMT data acquired by the input unit 151. As illustrated in FIG. 5, the PMT data includes cell numbers for identifying cells and output values (see FIG. 3) of the respective PMTs (PMT 1 to PMT 10 in FIG. 5). The input unit 151 supplies the acquired PMT data to the analysis unit 152 or the discrimination unit 155.

The analysis unit 152 acquires the PMT data from the input unit 151 and analyzes the PMT data. Specifically, the analysis unit 152 performs a computation process on the PMT data, and converts the PMT data into amounts of luminescence of respective fluorophores (hereinafter, referred to as fluorophore information).

Figure 6:
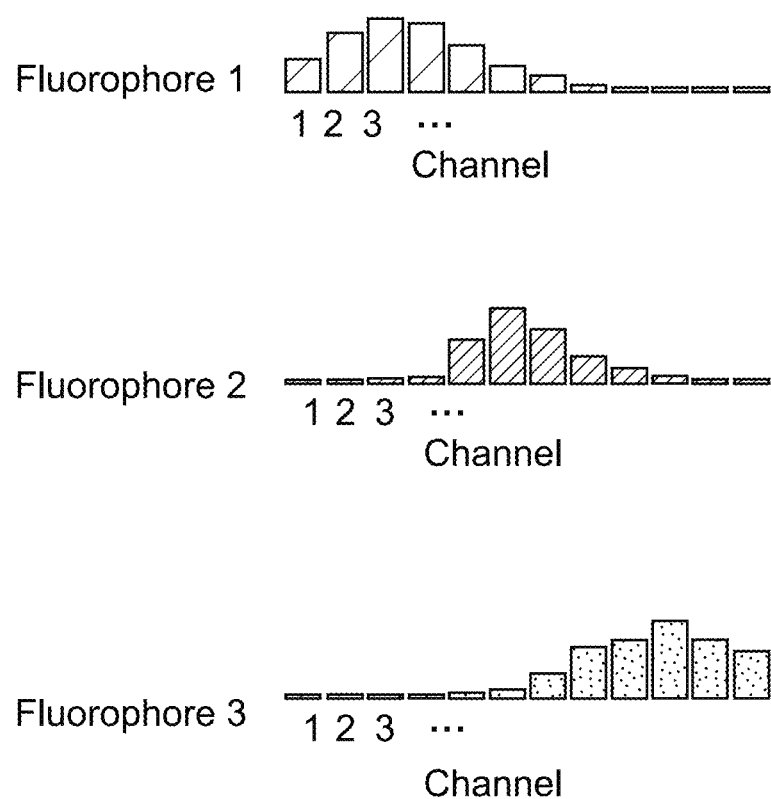
FIG. 6 illustrates an example of reference spectra of trend dyes used by an analysis unit of the information processing apparatus.
Figure 7:
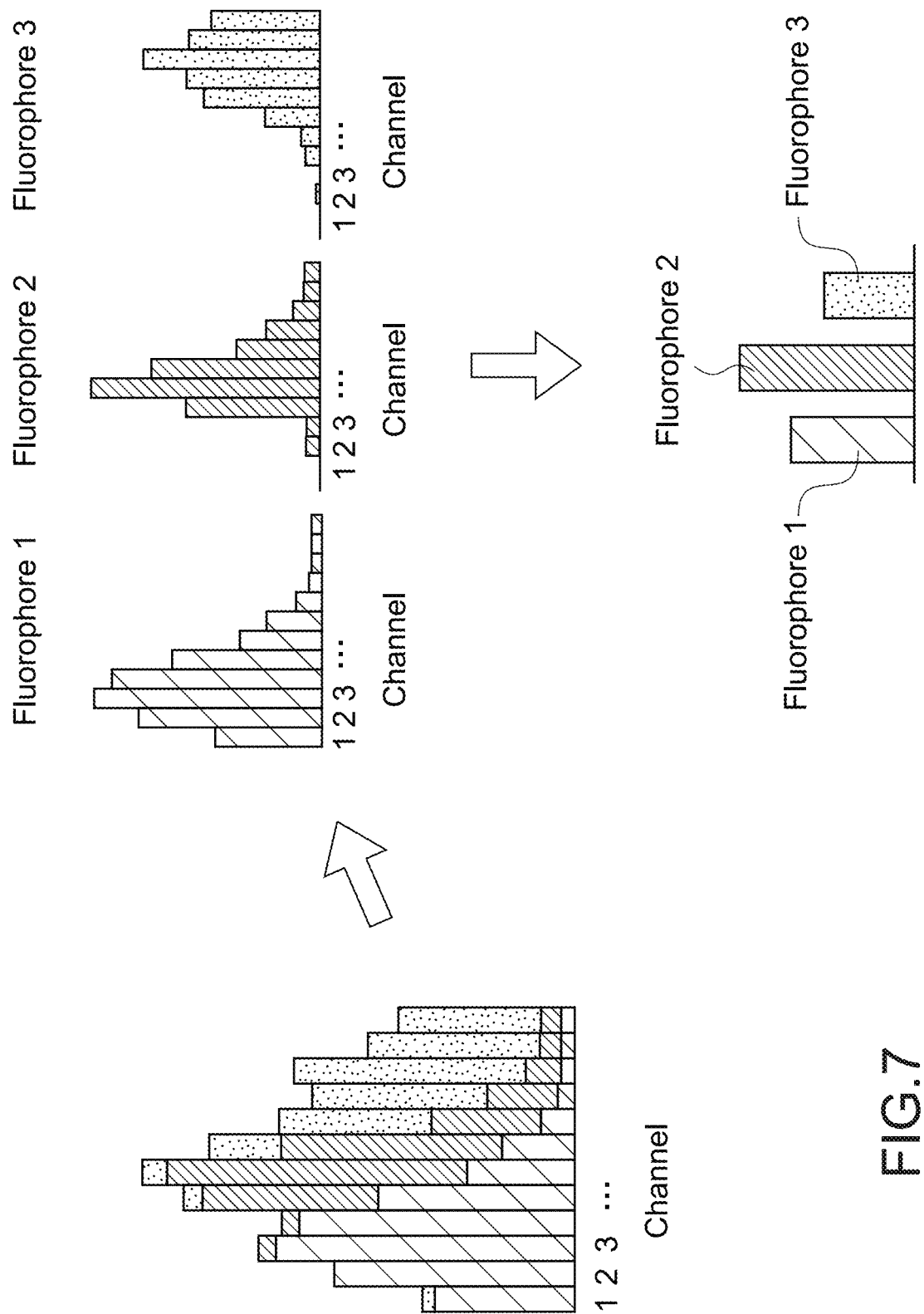
FIG. 7 is a schematic diagram illustrating a fluorophore information calculation method used by the analysis unit of the information processing apparatus.

FIG. 6 illustrates an example of reference spectra of respective fluorophores bound to cells input to the flow cytometer 110. These reference spectra are held by the analysis unit 152 in advance. FIG. 7 is a schematic diagram illustrating a method of calculating fluorophore information from the PMT data. As illustrated in FIG. 7, the analysis unit 152 performs a computation process on the reference spectra of the respective fluorophores and calculates luminescence rates of the fluorophores (fluorophore information).

Figure 8:
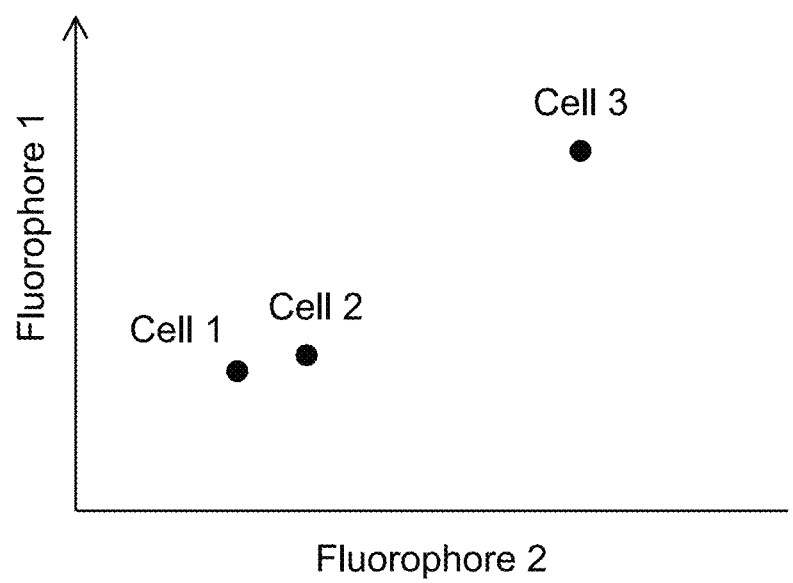
FIG. 8 illustrates an example of fluorophore information calculated by the analysis unit of the information processing apparatus.

For example, a weighted least-square method (WLSM) can be used for this computation process. Alternatively, it is also possible for the analysis unit 152 to calculate the fluorophore information from the PMT data by using another computation method. FIG. 8 is a graph that plots amounts of luminescence of fluorophores of the respective cells (fluorophore information). FIG. 8 relates to a fluorophore 1 and a fluorophore 2.

Figure 9:
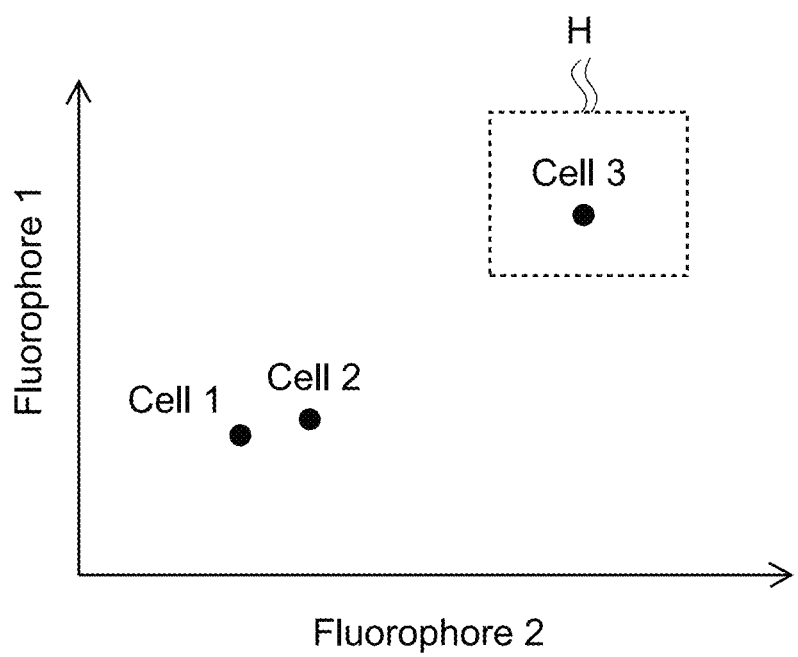
FIG. 9 illustrates an example of a process target range used by the analysis unit of the information processing apparatus to discriminate a process target.

In addition, the analysis unit 152 discriminates whether or not to treat the respective cells as process targets on the basis of the fluorophore information. FIG. 9 is a schematic diagram illustrating discrimination styles. A user is capable of designating a range where the user wants to process (hereinafter, referred to as a process target range H) with reference to the fluorophore information as illustrated in FIG. 9. Note that, the shape of the process target range H is not limited to a rectangular shape. It is possible for the process target range H to have any shape.

The analysis unit 152 discriminates whether or not each cell is included in the process target range H. In the example illustrated in FIG. 5, a "cell 1" and a "cell 2" are not included in the process target range H, but a "cell 3" is included in the process target range H.

The analysis unit 152 adds marks indicating discrimination results of the respective cells into the PMT data. FIG. 10 illustrates an example of the PMT data including the marks indicating discrimination results. As illustrated in FIG. 10, the PMT data includes the marks indicating the discrimination results (Y/N) of the respective cells. The analysis unit 152 supplies the PMT data including the marks indicating discrimination results (hereinafter, referred to as teaching data) to the learning unit 153.

The learning unit 153 applies a machine learning algorithm to the teaching data, and learns characteristics of the PMT data whose fluorophore information is estimated to be included in the process target range H. The algorithm used by the learning unit 153 for the machine learning is not specifically limited. A random forest, a support-vector machine, or the like may be used. The learning unit 153 causes the dictionary 154 to hold dictionary data generated through the machine learning.

When the PMT data is supplied from the input unit 151, the discrimination unit 155 uses the dictionary data held by the dictionary 154 and discriminates whether or not a cell is a process target. The discrimination unit 155 generates instructions indicating whether or not to sort the cells on the basis of the discrimination results, and supplies the instructions to the control unit 116.

[Operation of Particle Sorting System]

Figure 11:
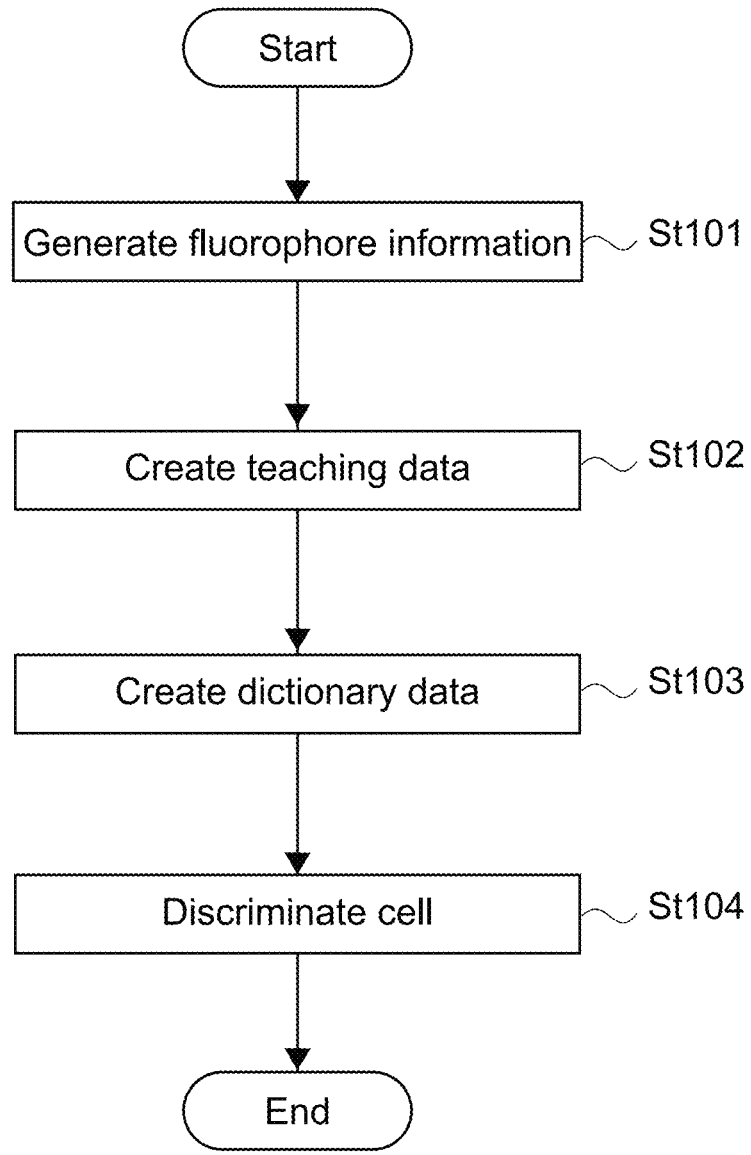
FIG. 11 is a flowchart illustrating operation of the information processing apparatus.

Operation of the particle sorting system 100 will be described. FIG. 11 is a flowchart illustrating operation of the particle sorting system 100. The particle sorting system 100 operates in two phase including a phase (hereinafter, referred to as a learning phase) of creating dictionary data through machine learning, and a phase (hereinafter, sorting phase) of sorting cells by using the created dictionary data.

In the learning phase, the cells are input to the flow cytometer 110, and the PMTs 134 generate PMT data. The input unit 151 acquires the PMT data, and supplies it to the analysis unit 152. The analysis unit 152 converts the PMT data into fluorophore information (St 101). Next, the analysis unit 152 discriminates whether or not the fluorophore information is included in the process target range H with regard to each of the cells, adds marks indicating results of the discrimination into the PMT data, and creates teaching data (St 102).

The analysis unit 152 supplies the teaching data to the learning unit 153. The learning unit 153 performs machine learning on the basis of the teaching data, and creates dictionary data (St 103). The above-described steps are included in the learning phase. In the learning phase, amounts of cells to be input to the flow cytometer 110 are not specifically limited. For example, approximately half of all cells may be input.

In the sorting phase, the rest of the cells are input to the flow cytometer 110, and the PMTs 134 generate PMT data. The input unit 151 acquires the PMT data, and supplies it to the discrimination unit 155. The discrimination unit 155 discriminates whether or not the cells are process targets by using the dictionary data (St 104), and supplies control signals to the flow cytometer 110 on the basis of results of the discrimination.

Figure 12:
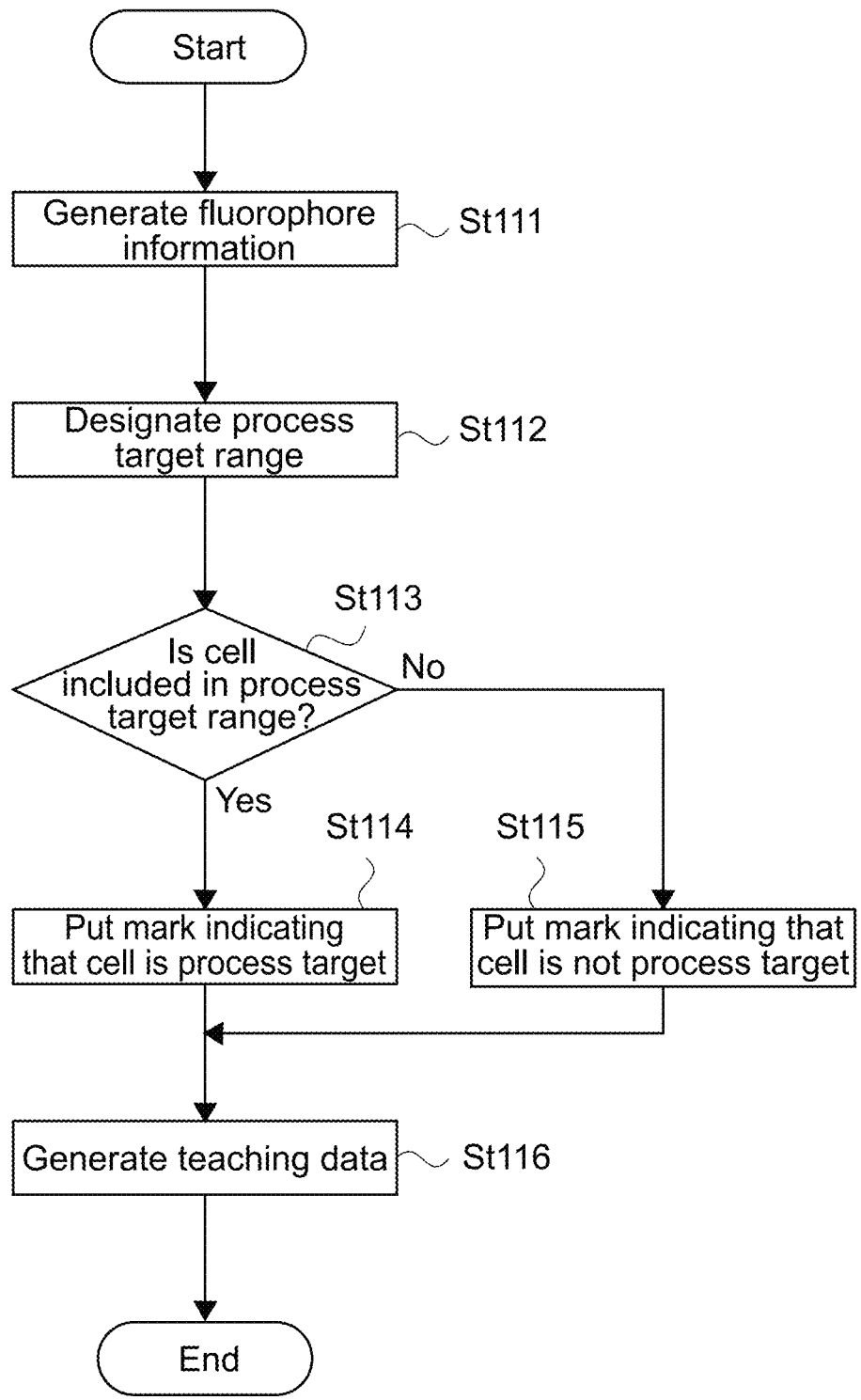
FIG. 12 is a flowchart illustrating operation of the analysis unit of the information processing apparatus.

FIG. 12 is a flowchart illustrating details of operation of the analysis unit 152. As illustrated in FIG. 12, when the PMT data is supplied from the input unit 151 in the learning phase, the analysis unit 152 converts the PMT data into luminescence dye information (St 111). Next, a user designates the process target range H with reference to the luminescence dye information, and the analysis unit 152 accepts the designation (St 112).

The analysis unit 152 determines whether or not fluorophore information is included in the process target range H with regard to each cell (St 113). In the case where the fluorophore information is included in the process target range H (Yes in St 113), the analysis unit 152 puts a mark on the PMT data of the cell, the mark indicating that the cell is a process target (St 114). In addition, in the case where the fluorophore information is not included in the process target range H (No in St 113), the analysis unit 152 puts a mark on the PMT data of the cell, the mark indicating that the cell is not a process target (St 115). The analysis unit 152 determines whether or not fluorophore information is included in the process target range H with regard to all the cells input to the flow cytometer 110 in the learning phase.

Next, the analysis unit 152 treats the PMT data associated with the discrimination results as teaching data (St 116), and supplies the teaching data to the learning unit 153.

Figure 13:
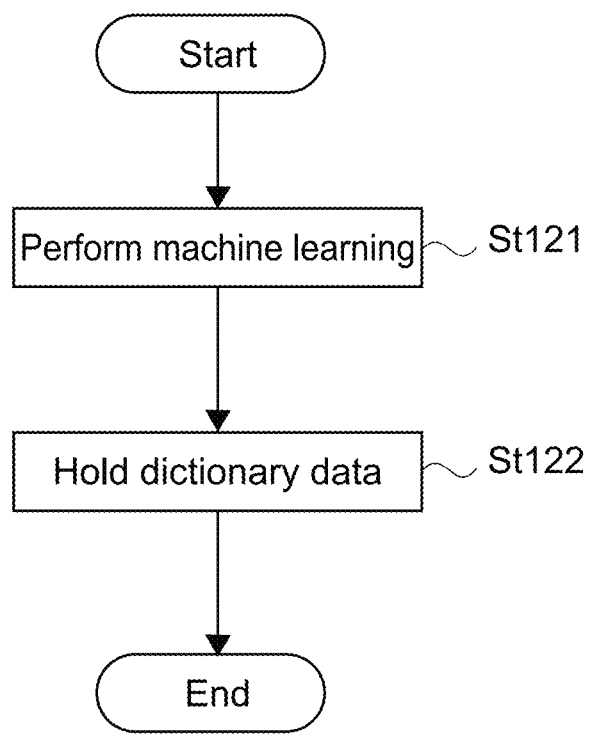
FIG. 13 is a flowchart illustrating operation of the learning unit of the information processing apparatus.

FIG. 13 is a flowchart illustrating details of operation of the learning unit 153. As illustrated in FIG. 13, the learning unit 153 executes a machine learning algorithm while using the teaching data as an input, and performs machine learning (St 121). Next, the learning unit 153 causes the dictionary 154 to hold dictionary data generated through the machine learning (St 122).

Figure 14:
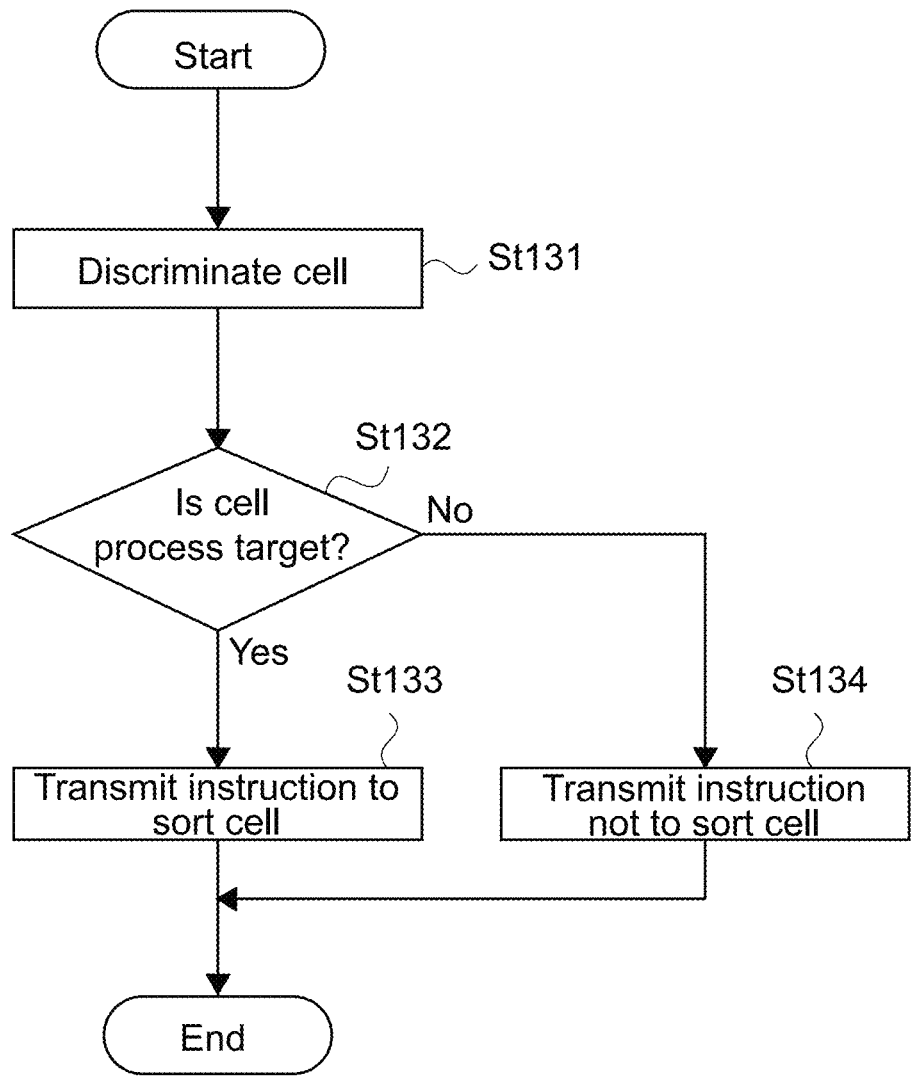
FIG. 14 is a flowchart illustrating operation of the discrimination unit of the information processing apparatus.

FIG. 14 is a flowchart illustrating details of operation of the discrimination unit 155. As illustrated in FIG. 14, when the PMT data is supplied from the input unit 151 in the sorting phase, the discrimination unit 155 discriminates whether or not a cell is a process target on the basis of the dictionary data (St 131). Specifically, the discrimination unit 155 discriminates whether or not fluorophore information calculated from the PMT data is included in the process target range H by comparing the PMT data with the dictionary data, without converting the PMT data into fluorophore information.

In the case where the discrimination unit 155 discriminates a cell as the process target, that is, in the case where the discrimination unit 155 discriminates the fluorophore information as PMT data that is estimated to be included in the process target range H (Yes in St 132), the discrimination unit 155 transmits an instruction to the flow cytometer 110 to sort the cell (St 133). Alternatively, in the case where the discrimination unit 155 does not discriminates the cell as the process target, that is, in the case where the discrimination unit 155 discriminates the fluorophore information as PMT data that is estimated to be outside the process target range H (No in St 132), the discrimination unit 155 transmits an instruction to the flow cytometer 110 not to sort the cell (St 134).

The particle sorting system 100 operates as described above. As described above, when learning characteristics of the PMT data whose fluorophore information is included in the process target range in the learning phase, it is possible to discriminate whether or not a cell is a process target by directly using the PMT data, without calculating fluorophore information in the sorting phase. Although relatively large amounts of computation is necessary for calculating fluorophore information, such computation is not necessary in the sorting phase. Therefore, it is possible to discriminate cells in a short time, that is, it is possible to sort the cells immediately after fluorescence observation by the flow cytometer 110.

Second Embodiment

A particle sorting system according to a second embodiment of the present technology will be described. A particle sorting system 200 according to the second embodiment includes the flow cytometer 110 and an information processing apparatus 250. The configuration of the flow cytometer 110 is not described here because the configuration of the flow cytometer 110 is similar to the first embodiment.

[Configuration of Information Processing Apparatus]

Figure 15:
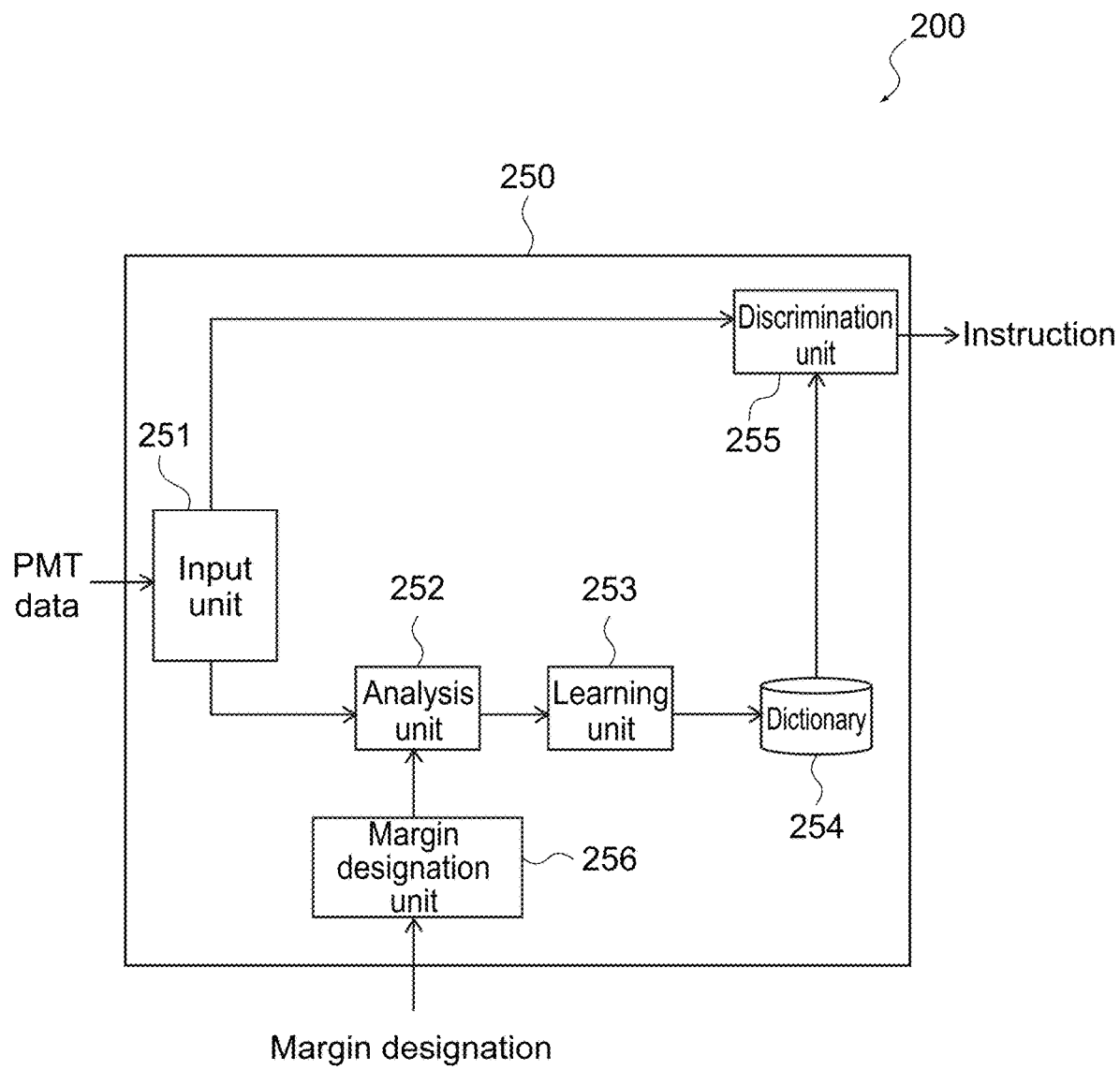
FIG. 15 is a schematic diagram illustrating an information processing apparatus included in a particle sorting system according to a second embodiment of the present technology.

FIG. 15 is a block diagram illustrating a functional configuration of the information processing apparatus 250.

As illustrated in FIG. 15, the information processing apparatus 250 includes an input unit 251, an analysis unit 252, a learning unit 253, a dictionary 254, a discrimination unit 255, and a margin designation unit 256.

The configurations of the input unit 251, the learning unit 253, the dictionary 254, and the discrimination unit 255 are similar to the first embodiment.

Therefore, the input unit 251 acquires PMT data from the PMTs 134 in the flow cytometer 110, and supplies it to the analysis unit 252 or the discrimination unit 255. The learning unit 253 performs machine learning by using teaching data supplied from the analysis unit 252 as an input, generates dictionary data, and causes the dictionary 254 to hold the dictionary data. The discrimination unit 255 compares the PMT data supplied from the input unit 251 with the dictionary data, and determines whether or not cells are process targets.

Figures 16, 17:
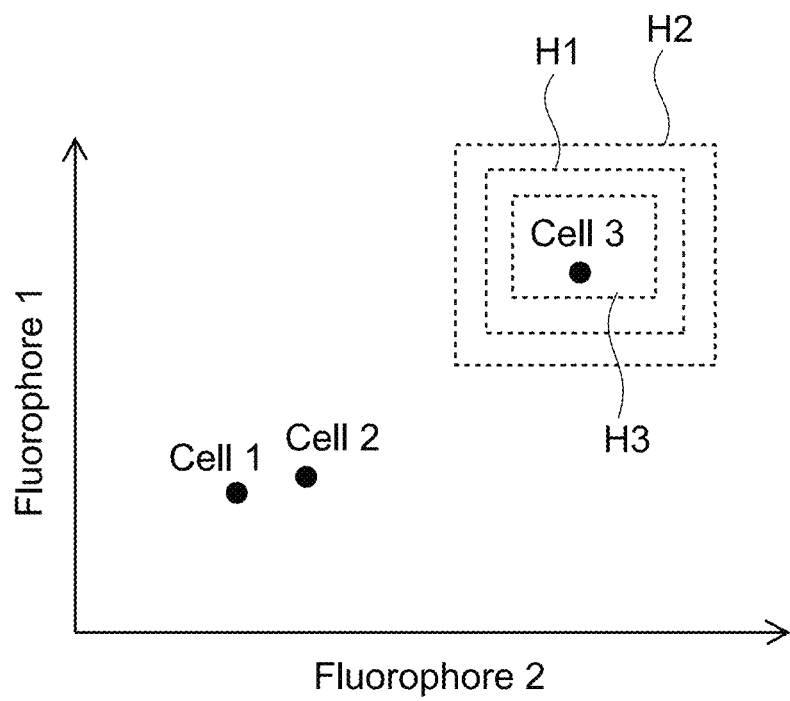
FIG. 16 illustrates an example of margin information held by a margin designation unit of the information processing apparatus.
FIG. 17 illustrates an example of a process target range on which a margin is set, the process target range being used by an analysis unit of the information processing apparatus to discriminate a process target.

The margin designation unit 256 designates a margin set on the process target range H. The margin designation unit 256 holds pre-decided margin information. FIG. 16 illustrates an example of margin information. As illustrated in FIG. 16, in the margin information, margins are set for respective modes. The margin designation unit 256 selects one of the modes and supplies a margin according to the mode to the analysis unit 252.

The margin designation unit 256 is capable of selecting a mode in response to designation by a user. Alternatively, it is also possible for the margin designation unit 256 to automatically select a mode on the basis of a past experiment result database or the like.

The analysis unit 252 sets the margin supplied from the margin designation unit 256 on the process target range H. FIG. 17 is a schematic diagram illustrating styles of setting margins on the process target range H. As illustrated in FIG. 17, the analysis unit 252 sets margins to a process target range H1 designated by the user, and makes a process target range H2 and a process target range H3. The process target range H2 is obtained by enlarging the process target range H1, and the process target range H3 is obtained by reducing the process target range H1.

[Operation of Information Processing Apparatus]

Figure 18:
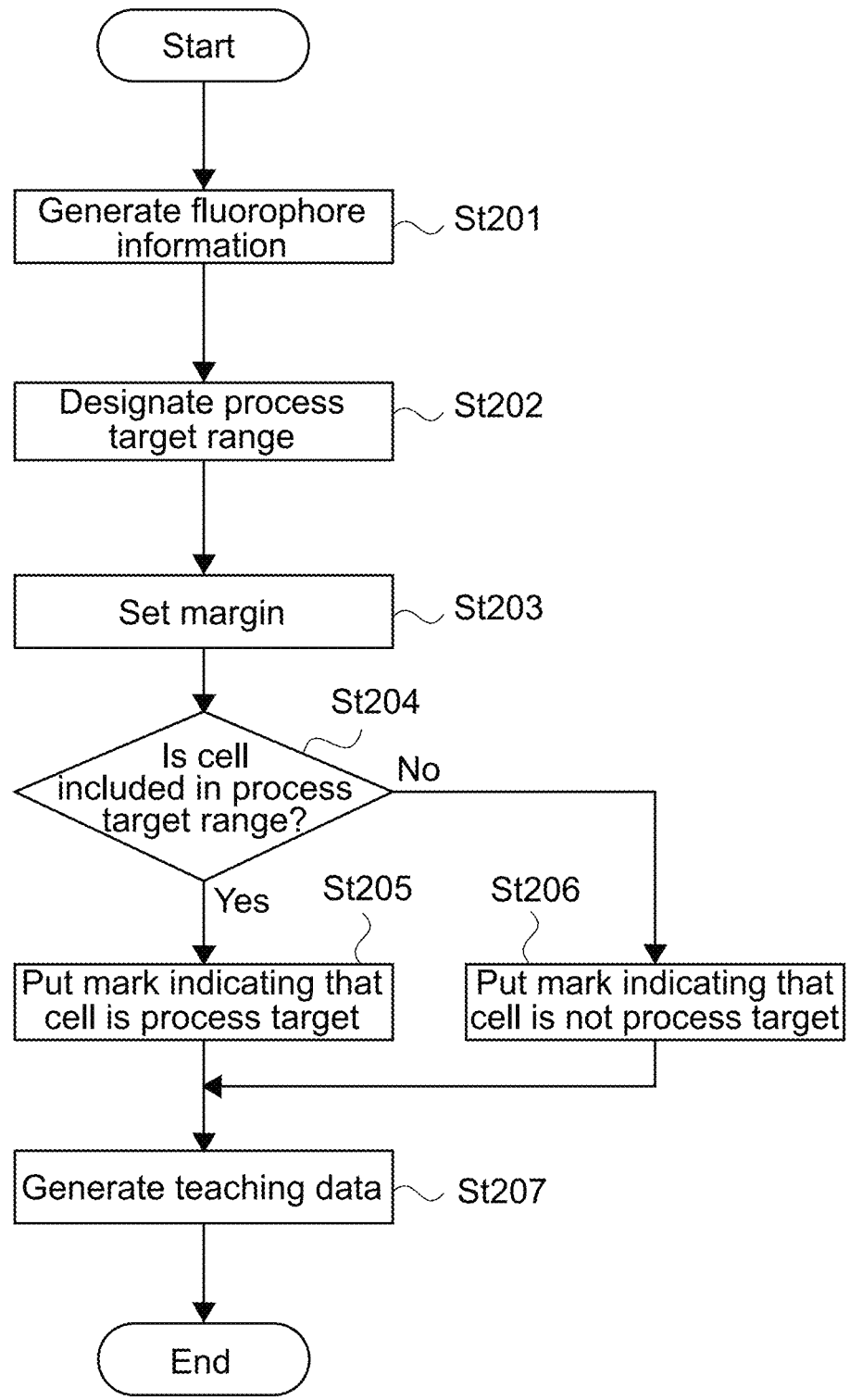
FIG. 18 is a flowchart illustrating operation of the analysis unit of the information processing apparatus.

FIG. 18 is a flowchart illustrating details of operation of the analysis unit 252. As illustrated in FIG. 18, when the PMT data is supplied from the input unit 251 in the learning phase, the analysis unit 252 converts the PMT data into luminescence dye information (St 201). Next, a user designates the process target range H with reference to the luminescence dye information, and the analysis unit 252 accepts the designation (St 202).

Next, the analysis unit 252 sets a margin designated by the margin designation unit 256 on the process target range H (St 203), and determines whether or not fluorophore information is included in the process target range H with regard to each cell (St 204).

In the case where the fluorophore information of a cell is included in the process target range H (Yes in St 204), the analysis unit 252 puts a mark on the PMT data of the cell, the mark indicating that the cell is a process target (St 205). Alternatively, in the case where the fluorophore information of the cell is not included in the process target range H (No in St 204), the analysis unit 252 puts a mark on the PMT data of the cell, the mark indicating that the cell is not a process target (St 206). The analysis unit 252 determines whether or not fluorophore information is included in the process target range H with regard to all the cells input to the flow cytometer 110 in the learning phase.

Next, the analysis unit 252 treats the PMT data associated with discrimination results as teaching data (St 207), and supplies the teaching data to the learning unit 253.

As described above, according to this embodiment, the analysis unit 252 sets a margin designated by the margin designation unit 256 on a process target range, and enlarges or reduces the process target range. In the first embodiment, sometimes a problem of a false positive may occur. When this problem occurs, the discrimination unit 155 discriminates a cell that should not be sorted as a cell that should be sorted in practice. When the margin is set on the process target range according to this embodiment, it is possible to control false positive situations by relaxing or tightening discrimination between cells.

Third Embodiment

A particle sorting system according to a third embodiment of the present technology will be described. A particle sorting system 300 according to the third embodiment includes the flow cytometer 110 and an information processing apparatus 350. The configuration of the flow cytometer 110 is not described here because the configuration of the flow cytometer 110 is similar to the first embodiment.

[Configuration of Information Processing Apparatus]

Figure 19:
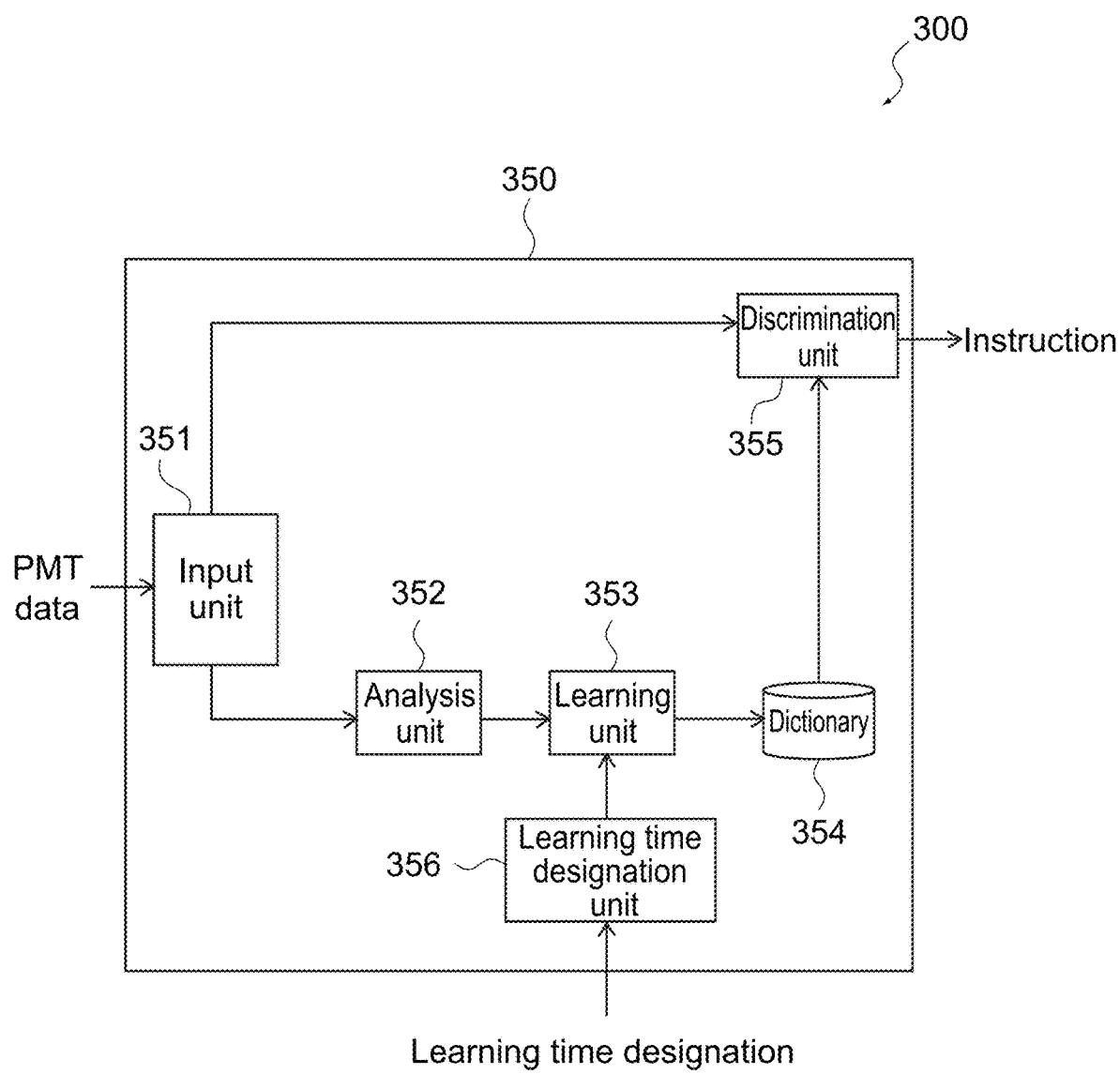
FIG. 19 is a schematic diagram illustrating an information processing apparatus included in a particle sorting system according to a third embodiment of the present technology.

FIG. 19 is a block diagram illustrating a functional configuration of the information processing apparatus 350. As illustrated in FIG. 19, the information processing apparatus 350 includes an input unit 351, an analysis unit 352, a learning unit 353, a dictionary 354, a discrimination unit 355, and a learning time designation unit 356.

The configurations of the input unit 351, the analysis unit 352, the dictionary 354, and the discrimination unit 355 are similar to the first embodiment.

Therefore, the input unit 351 acquires PMT data from the PMTs 134 in the flow cytometer 110, and supplies it to the analysis unit 352 or the discrimination unit 355. The analysis unit 352 converts the PMT data into fluorophore information, discriminates whether or not the fluorophore information is included in the process target range, adds a mark indicating results of the discrimination into the PMT data, and generates teaching data. The discrimination unit 355 compares the PMT data supplied from the input unit 351 with dictionary data, and determines whether or not cells are process targets.

Figures 20, 21:
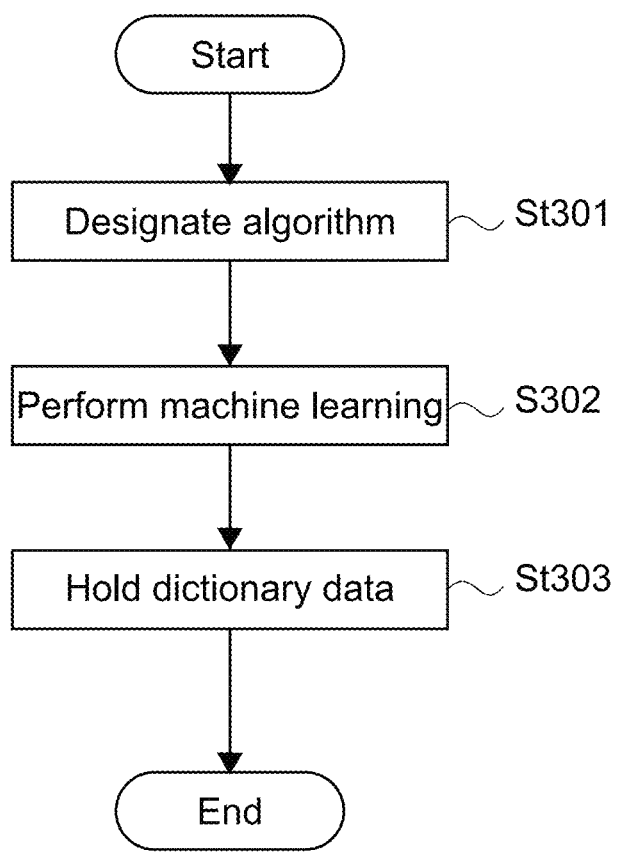
FIG. 20 illustrates an example of machine learning algorithms held by a learning time designation unit of the information processing apparatus.
FIG. 21 is a flowchart illustrating operation of a learning unit of the information processing apparatus.

The learning time designation unit 356 designates a machine learning algorithm. The learning time designation unit 356 holds information of a plurality of types of machine learning algorithms. FIG. 20 illustrates an example of machine learning algorithms held by the learning time designation unit 356. As illustrated in FIG. 20, the learning time designation unit 356 holds machine learning algorithms having different lengths of machine learning time for respective modes. The learning time designation unit 356 selects one of the modes in response to designation by a user or the like, and notifies the learning unit 353 of the machine learning algorithm of the selected mode. Alternatively, it is also possible for the learning time designation unit 356 to automatically select a mode on the basis of a past experiment result database or the like.

The learning unit 353 applies a machine learning algorithm to the teaching data, and learns patterns of the PMT data included in the process target range H. At this time, the learning unit 353 applies a machine learning algorithm designated by the learning time designation unit 356. The learning unit 353 causes the dictionary 354 to hold dictionary data generated through the machine learning.

[Operation of Information Processing Apparatus]

FIG. 21 is a flowchart illustrating details of operation of the learning unit 353. As illustrated in FIG. 21, the learning unit 353 accepts designation of the machine learning algorithm by the learning time designation unit 356 (St 301). Next, when the learning unit 353 receives teaching data supplied from the analysis unit 352 in the learning phase, the learning unit 353 uses the teaching data as an input, executes the machine learning algorithm reported from the learning time designation unit 356, and performs machine learning (St 302). Next, the learning unit 353 causes the dictionary 354 to hold dictionary data generated through the machine learning (St 303).

As described above, according to this embodiment, the learning unit 353 performs machine learning by using a machine learning algorithm designated by the learning time designation unit 356. Most of flow cytometers bind a fluorophore to a cell through antigen-antibody interaction. Sometimes reactivity decreases as time elapses, and it becomes difficult to bind the fluorophore to the cell. Accordingly, the learning time designation unit 356 designates a machine learning algorithm in accordance with a length of time available for the learning phase, and thereby adjust a length of time it takes to perform machine learning. This makes it possible to prevent effects on fluorescence detection caused by decrease in reactivity or the like of antigen-antibody interaction.

Fourth Embodiment

A particle sorting system according to a fourth embodiment of the present technology will be described. A particle sorting system 400 according to the fourth embodiment includes the flow cytometer 110 and an information processing apparatus 450. The configuration of the flow cytometer 110 is not described here because the configuration of the flow cytometer 110 is similar to the first embodiment.

[Configuration of Information Processing Apparatus]

Figure 22:
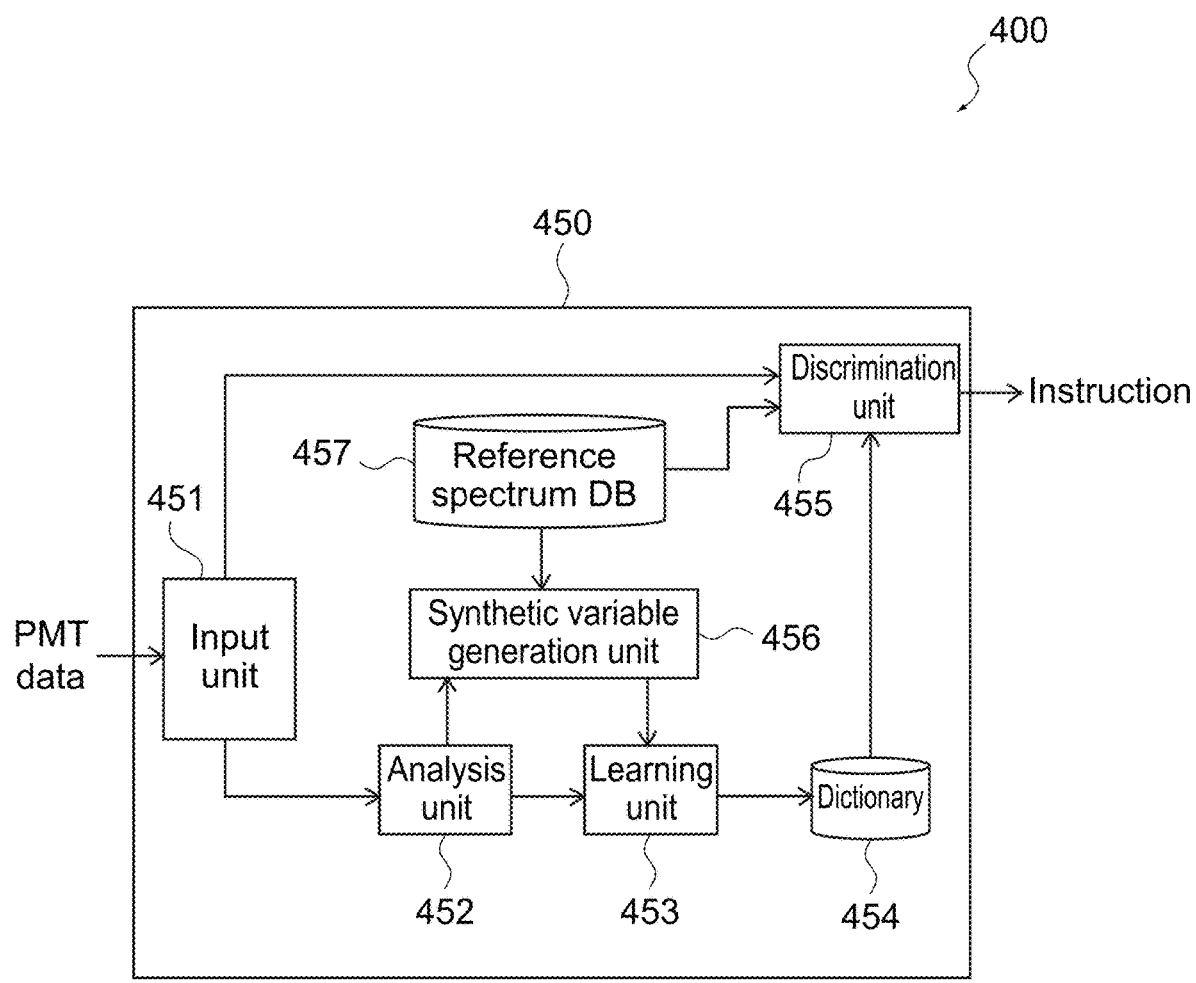
FIG. 22 is a schematic diagram illustrating an information processing apparatus included in a particle sorting system according to a fourth embodiment of the present technology.

FIG. 22 is a block diagram illustrating a functional configuration of the information processing apparatus 450. As illustrated in FIG. 22, the information processing apparatus 450 includes an input unit 451, an analysis unit 452, a learning unit 453, a dictionary 454, a discrimination unit 455, a synthetic variable generation unit 456, and a reference spectrum database 457.

The configurations of the input unit 451 and the dictionary 454 are similar to the first embodiment.

Therefore, the input unit 451 acquires PMT data from the PMTs 134 in the flow cytometer 110, and supplies it to the analysis unit 452 or the discrimination unit 455. The dictionary 454 holds dictionary data generated by the learning unit 453.

The synthetic variable generation unit 456 creates a synthetic variable and supplies it to the analysis unit 452. The synthetic variable generation unit 456 acquires respective PMT values (hereinafter, referred to as reference values) of reference spectra of fluorophores bound to cells, from the reference spectrum database 457 (see FIG. 6). FIG. 23 is a table showing an example of the reference values.

Figure 24:
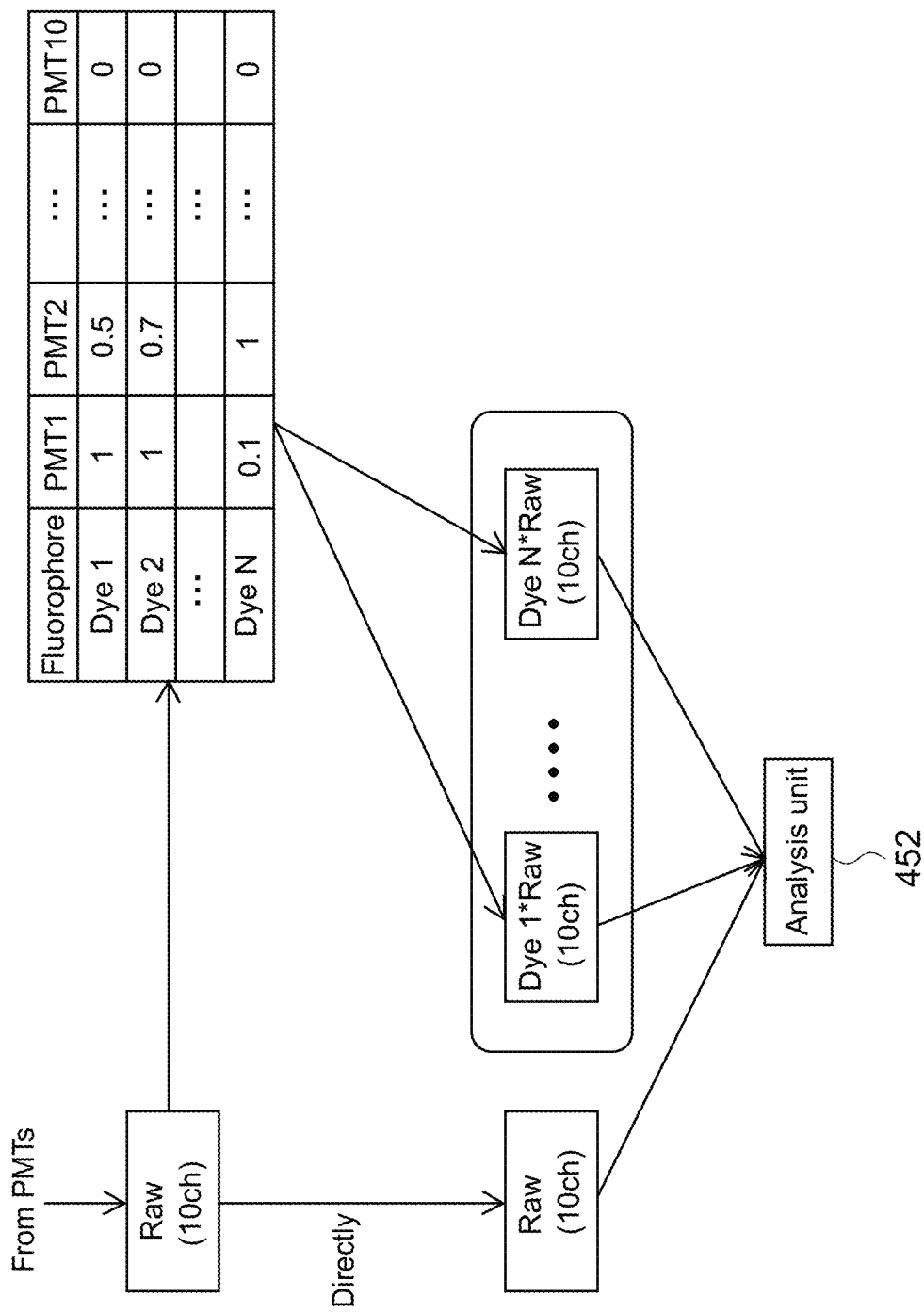
FIG. 24 is a schematic diagram illustrating a usage style of a synthetic variable in the information processing apparatus.

The synthetic variable generation unit 456 acquires PMT data (hereinafter, referred to as "original PMT data") detected by the fluorescence detection unit 113 from the analysis unit 452, and creates synthetic variables from the original PMT data and the reference values. FIG. 24 is a schematic diagram illustrating a synthetic variable generation method. As illustrated in FIG. 24, when it is assumed that the original PMT data (Raw) includes 10 ch and the number of fluorophores are two, the synthetic variable generation unit 421 generates synthetic variables (10 ch) of a dye 1 and synthetic variables (10 ch) of a dye 2. Computation of synthetic variables may be multiplication or may be addition.

The synthetic variable generation unit 421 supplies the calculated synthetic variables of respective colors to the analysis unit 452. In the above-described example, the synthetic variable generation unit 421 supplies total of 30 ch (30 dimensions) of data to the analysis unit 425. The 30 ch (30 dimensions) of data include the original PMT data (10 ch), the synthetic variables (10 ch) of the dye 1, and the synthetic variables (10 ch) of the dye 2.

The analysis unit 452 creates teaching data on the basis of the original PMT data, the synthetic variables supplied from the synthetic variable generation unit 421, and discrimination results (whether or not fluorophore information generated from the PMT data is included in the process target range H).

FIG. 25 illustrates an example of the teaching data generated by the analysis unit 452. As illustrated in FIG. 25, the teaching data includes the original PMT data, synthetic variables generated from the original PMT data, and discrimination results.

The learning unit 453 performs machine learning through a machine learning algorithm by using the teaching data supplied from the analysis unit 452 as an input, and causes the dictionary 454 to hold generated dictionary data.

When the original PMT data is supplied from the input unit 451, the discrimination unit 455 generates synthetic variables from the original PMT data and reference values. The discrimination unit 455 uses the dictionary data held by the dictionary 454 and the calculated synthetic variables, and discriminates whether or not cells are process targets. The discrimination unit 455 supplies results of the discrimination to the flow cytometer 110.

[Operation of Information Processing Apparatus]

Figure 26:
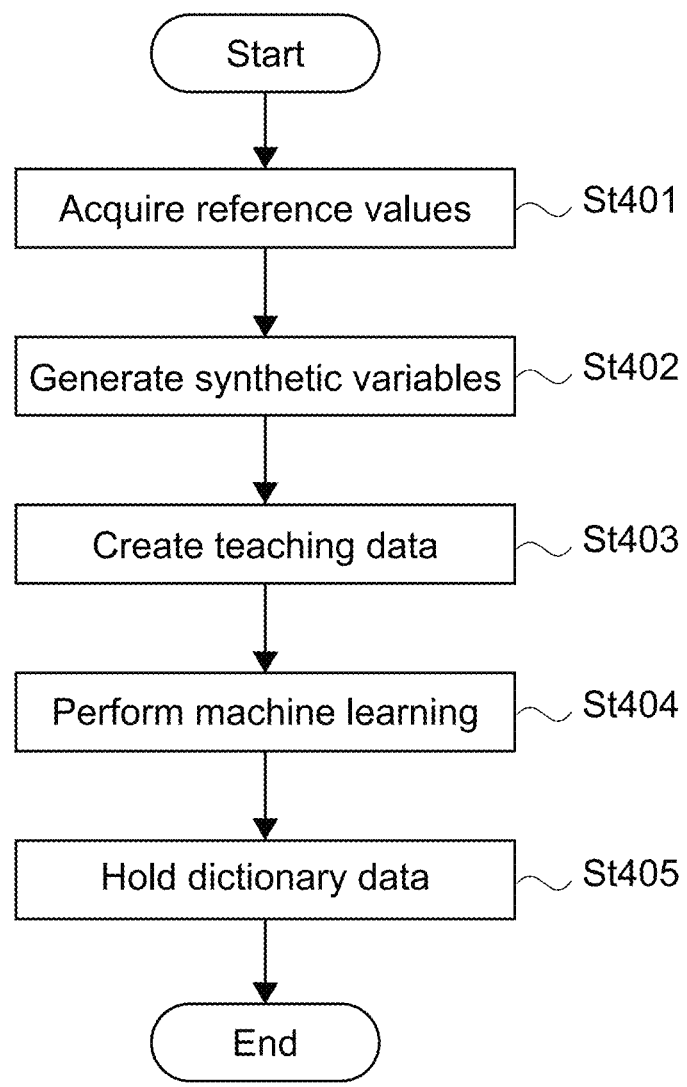
FIG. 26 is a flowchart illustrating operation of the information processing apparatus.

FIG. 26 is a flowchart illustrating operation of the information processing apparatus 450 in the learning phase. As illustrated in FIG. 26, the synthetic variable generation unit 456 acquires reference values from the reference spectrum database 457 (St 401).

Next, the synthetic variable generation unit 456 creates synthetic variables from the reference values and the original PMT data acquired from the analysis unit 425 (St 402), and supplies the created synthetic variables to the analysis unit 452.

The analysis unit 452 creates teaching data indicating whether or not to sort cells on the basis of the original PMT data, the fluorophore information, and the synthetic variables supplied from the synthetic variable generation unit 456 (St 403), and supplies the created teaching data to the learning unit 453.

The learning unit 453 performs machine learning through a machine learning algorithm by using the teaching data supplied from the analysis unit 452 as an input (St 404). The learning unit 453 causes the dictionary 454 to hold generated dictionary data (St 405).

Figure 27:
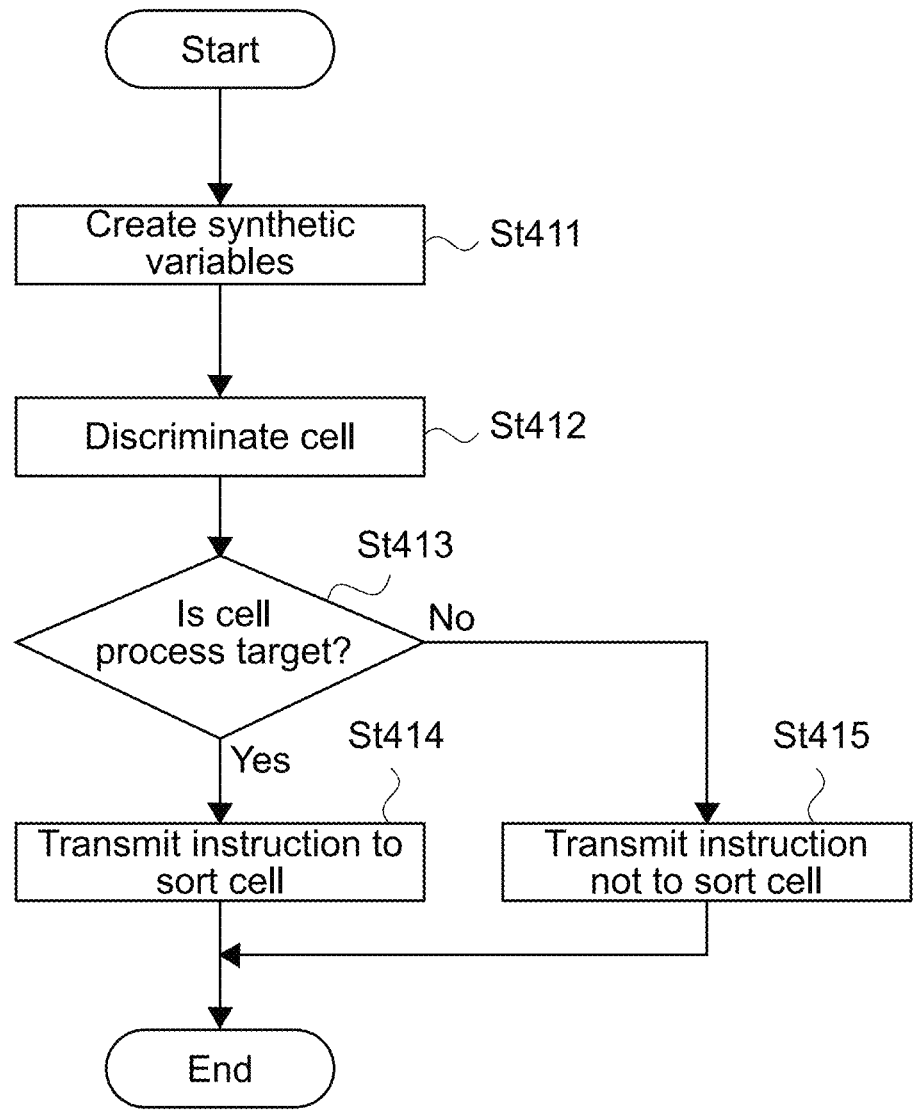
FIG. 27 is a flowchart illustrating operation of a discrimination unit of the information processing apparatus.

FIG. 27 is a flowchart illustrating details of operation of the discrimination unit 455 in the sorting phase. As illustrated in FIG. 27, when the original PMT data is supplied from the input unit 451, the discrimination unit 455 creates synthetic variables from the original PMT data and reference values in a way similar to the learning phase (St 411).

Next, the discrimination unit 455 discriminates whether or not cells are process targets on the basis of the original PMT data, the synthetic variables, and the dictionary data (St 412). Specifically, the discrimination unit 455 discriminates whether or not the fluorophore information calculated from the original PMT data is included in the process target range H by comparing the original PMT data and the synthetic variables with the dictionary data, without converting them into fluorophore information.

In the case where the discrimination unit 455 discriminates a cell as a process target (Yes in St 413), the discrimination unit 455 transmits an instruction to the flow cytometer 110 to sort the cell (St 414). Alternatively, in the case where the discrimination unit 455 does not discriminate the cell as the process target (No in St 413), the discrimination unit 455 transmits an instruction to the flow cytometer 110 not to sort the cell (St 415).

As described above, according to this embodiment, the machine learning also uses the synthetic variables in addition to the PMT data. By using the synthetic variables for the machine learning, it is possible to increase amounts of characteristics of the machine learning, and improve system of the machine learning, that is, accuracy of discrimination of cells.

(Modification)

The second, third, and fourth embodiments described above are obtained by adding predetermined structural elements to the first embodiment described above. It is also possible to incorporate any two or three of the structural elements added to the second, third, and fourth embodiments, into the first embodiment.

In addition, in the above described embodiments, cells labeled with fluorophores are used as process target particles. However, the present technology is not limited thereto. The present technology is applicable to any particles as long as it is possible to analyze the particles through measurement of fluorescence.

(Hardware Configuration)

Figure 28:
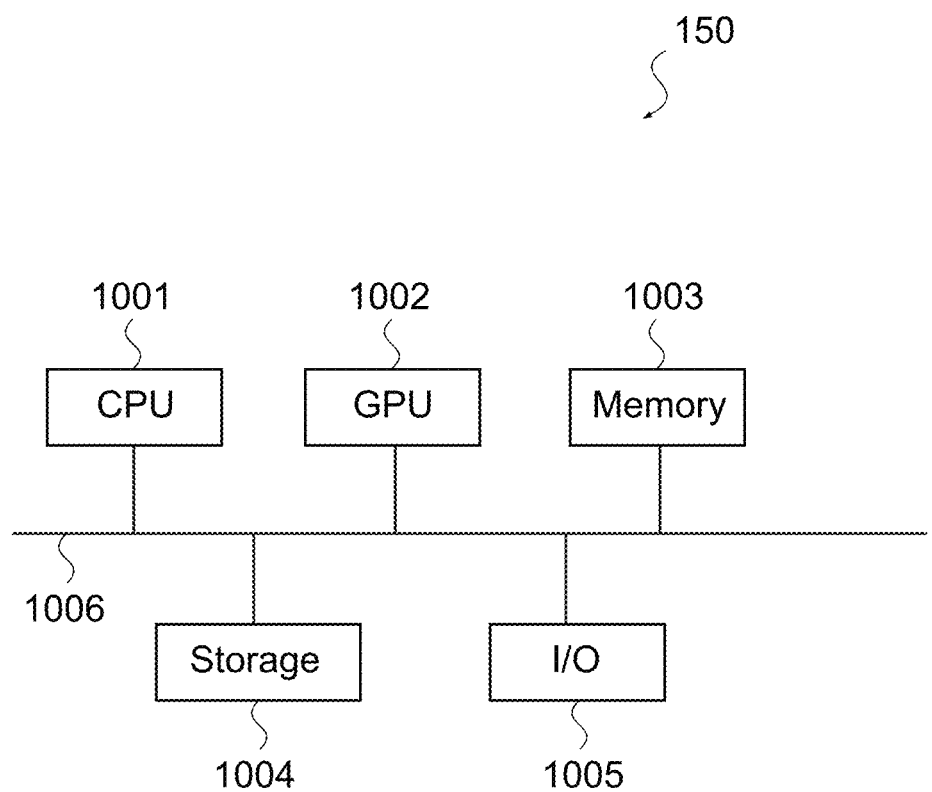
FIG. 28 is a block diagram illustrating a hardware configuration of the information processing apparatus according to the respective embodiments of the present technology.

FIG. 28 is a schematic diagram illustrating a hardware configuration of the information processing apparatus 150. As illustrated in FIG. 28, the information process device 150 includes a CPU 1001, a GPU 1002, memory 1003, a storage 1004, and an input/output unit (I/O) 1005 as the hardware configuration. They are connected to each other via a bus 1006.

The central processing unit (CPU) 1001 controls other structural elements in accordance with programs stored in the memory 003, processes data in accordance with the program, and stores a result of the process in the memory 1003. The CPU 1001 may be a microprocessor.

The graphic processing unit (GPU) 1002 executes an image process under the control of the CPU 1001. The GPU 1002 may be the microprocessor.

The memory 1003 stores data and programs to be executed by the CPU 1001. The memory 1003 may be random access memory (RAM).

The storage 1004 stores data and programs. The storage 1004 may be a hard disk drive (HDD) or a solid state drive (SSD).

The input/output unit 1005 receives inputs to the information processing apparatus 150, and supplies outputs from the information processing apparatus 150 to an outside. The input/output unit 1005 includes an input device such as a keyboard or a mouse, an output device such as a display, and a connection interface such as a network.

The hardware configuration of the information processing apparatus 1050 is not limited thereto as long as it is possible to achieve the functional configurations of the information processing apparatus 150. In addition, the entire hardware configuration described above or a part of the hardware configuration may be present on a network.

It is also possible for the information processing apparatus 250, the information processing apparatus 350, and the information processing apparatus 450 according to the second to fourth embodiments of the present technology to have hardware configurations similar to the information processing apparatus 150.

Note that, the present technology may also be configured as below.

(1)

An information processing apparatus including:

an analysis unit that calculates fluorophore information indicating respective amounts of luminescence of a plurality of types of fluorophores on the basis of detection data indicating amounts of luminescence of fluorescence at respective wavelength bands, the fluorescence having been emitted from a particle irradiated with excitation light, discriminates whether or not to treat the particle as a process target in accordance with the fluorophore information, and generates teaching data by associating a result of the discrimination with the detection data;

a learning unit that applies a machine learning algorithm to the teaching data, learns a characteristic of the detection data discriminated as the process target, and generates dictionary data including a result of the learning; and a discrimination unit that discriminates whether or not the particle whose detection data has been acquired is the process target on the basis of the dictionary data when the detection data is supplied.

(2)

The information processing apparatus according to (1), in which the analysis unit calculates the fluorophore information through a weighted least-square method.

(3)

The information processing apparatus according to (1) or (2), in which the analysis unit sets process target ranges with regard to the respective amounts of luminescence of the plurality of types of fluorophores, and discriminates whether or not to treat the particle as the process target in accordance with whether or not the fluorophore information is included in the process target range, and the information processing apparatus further includes a margin designation unit that designates a margin of the process target range.

(4)

The information processing apparatus according to any one of (1) to (3), further including a learning time designation unit that designates the machine learning algorithm to be used by the learning unit.

(5)

The information processing apparatus according to any one of (1) to (4), further including a synthetic variable generation unit that generates a synthetic variable on the basis of the detection data and reference spectra that are respective luminescence spectra of the plurality of types of fluorophores, in which the analysis unit generates the teaching data by associating the synthetic variable with the detection data together with the result of the discrimination, and the discrimination unit discriminates whether or not the particle whose detection data has been acquired is the process target on the basis of the dictionary data and the synthetic variable.

(6)

The information processing apparatus according to any one of (1) to (5), in which the particle is a cell fluorescently labeled with the plurality of types of fluorophores.

(7)

A particle sorting system including:

an excitation light emission unit that emits excitation light to a liquid including a particle;

a fluorescence detection unit including a detector that disperses fluorescence emitted from the particle irradiated with the excitation light, detects amounts of luminescence of the fluorescence at respective wavelength bands, and generates detection data;

an analysis unit that calculates fluorophore information indicating respective amounts of luminescence of a plurality of types of fluorophores on the basis of the detection data, discriminates whether or not to treat the particle as a process target in accordance with the fluorophore information, and generates teaching data by associating a result of the discrimination with the detection data;

a learning unit that applies a machine learning algorithm to the teaching data, learns a characteristic of the detection data discriminated as the process target, and generates dictionary data including a result of the learning; and a discrimination unit that discriminates whether or not the particle whose detection data has been acquired is the process target on the basis of the dictionary data when the detection data is supplied.

(8)

The particle sorting system according to (7), further including a particle sorting mechanism that sorts the particle on the basis of a result of the discrimination made by the discrimination unit.

(9)

The particle sorting system according to (8), in which the particle sorting mechanism generates a droplet including the particle, controls a path of the droplet by electrically charging the droplet, and sorts the particle.

(10)

A program that causes an information processing apparatus to function as:

an analysis unit that calculates fluorophore information indicating respective amounts of luminescence of a plurality of types of fluorophores on the basis of detection data indicating amounts of luminescence of fluorescence at respective wavelength bands, the fluorescence having been emitted from a particle irradiated with excitation light, discriminates whether or not to treat the particle as a process target in accordance with the fluorophore information, and generates teaching data by associating a result of the discrimination with the detection data;

a learning unit that applies a machine learning algorithm to the teaching data, learns a characteristic of the detection data discriminated as the process target, and generates dictionary data including a result of the learning; and a discrimination unit that discriminates whether or not the particle whose detection data has been acquired is the process target on the basis of the dictionary data when the detection data is supplied.

(11)

A particle sorting method including:

causing an analysis unit to calculate fluorophore information indicating respective amounts of luminescence of a plurality of types of fluorophores on the basis of detection data indicating amounts of luminescence of fluorescence at respective wavelength bands, the fluorescence having been emitted from a particle irradiated with excitation light, discriminate whether or not to treat the particle as a process target in accordance with the fluorophore information, and generate teaching data by associating a result of the discrimination with the detection data;

causing a learning unit to apply a machine learning algorithm to the teaching data, learn a characteristic of the detection data discriminated as the process target, and generate dictionary data including a result of the learning; and causing a discrimination unit to discriminate whether or not the particle whose detection data has been acquired is the process target on the basis of the dictionary data when the detection data is supplied.

REFERENCE SIGNS LIST 100, 200, 300, 400 particle sorting system
110 flow cytometer
111 sorting chip
112 excitation light emission unit
113 fluorescence detection unit
114, 115 deflection plate
116 control unit
117 electrode
150, 250, 350, 450 information processing apparatus
151, 251, 351, 451 input unit
152, 252, 352, 452 analysis unit
153, 253, 353, 453 learning unit
154, 253, 354, 454 dictionary
155, 255, 355, 455 discrimination unit
256 margin designation unit
356 learning time designation unit
456 synthetic variable generation unit
457 reference spectrum database

The invention claimed is:

1. An information processing method performed by processing circuitry, comprising:
    obtaining fluorophore information by performing a calculation based on detection data and reference spectra of plural types of fluorophores;
    outputting the fluorophore information to receive information on a process target;
    generating teaching data by associating with the detection data one or more groups of particles, based on the fluorophore information, wherein the one or more groups of particles are determined to be the process target based on the received information on the process target; and
    generating dictionary data by applying a machine learning algorithm to the teaching data, wherein the dictionary data is used to control a sorting mechanism.

2. The information processing method according to claim 1, wherein the fluorophore information is calculated through a weighted least-square method.

3. The information processing method according to claim 1, further comprising:
    receiving an input selecting a first group from among the one or more groups of particles, wherein the teaching data indicates which of the detection data is in the first group.

4. The information processing method according to claim 3, wherein receiving the input further comprises receiving user input from a user interface indicating selection of the first group.

5. The information processing method according to claim 3, wherein the dictionary data indicates whether a particle is included in the first group.

6. The information processing method according to claim 1, further comprising:
    storing the dictionary data.

7. The information processing method according to claim 6, further comprising:
    using the detection data and the dictionary data to generate an output; and
    controlling the sorting mechanism based on the output to sort at least some of the particles.

8. The information processing method according to claim 1, further comprising:
    obtaining the detection data indicating fluorescence emitted from one or more particles labeled with the plural types of fluorophores.

9. The information processing method according to claim 8, wherein the particles are cells.

10. The information processing method according to claim 1, further comprising: setting process target ranges with regard to respective amounts of luminescence of the plural types of fluorophores, discriminating whether or not to treat the particles as the process target in accordance with whether or not the fluorophore information is included in the process target range, and designating a margin of the process target range.

11. The information processing method according to claim 1, further comprising:
    designating the machine learning algorithm to be used.

12. The information processing method according to claim 1, further comprising generating a synthetic variable on a basis of the detection data and reference spectra that are respective luminescence spectra of the plural types of fluorophores, generating the teaching data by associating the synthetic variable with the detection data, and discriminating whether or not a particle whose detection data has been acquired is the process target on a basis of the dictionary data and the synthetic variable.

13. The information processing method according to claim 1, wherein the particles are cells fluorescently labeled with the plurality of types of fluorophores.

14. An information processing apparatus comprising:
    processing circuitry configured to:
    obtain fluorophore information by performing a calculation based on detection data and reference spectra of plural types of fluorophores;
    output the fluorophore information to receive information on a process target;
    generate teaching data by associating with the detection data one or more groups of particles, based on the fluorophore information, wherein the one or more groups of particles are determined to be the process target based on the received information on the process target; and
    generate dictionary data by applying a machine learning algorithm to the teaching data, wherein the dictionary data is used to control a sorting mechanism.

15. A non-transitory computer readable medium containing instructions that, when executed by processing circuitry, perform a method comprising:
    obtaining fluorophore information by performing a calculation based on detection data and reference spectra of plural types of fluorophores;
    outputting the fluorophore information to receive information on a process target;
    generating teaching data by associating with the detection data one or more groups of particles, based on the fluorophore information, wherein the one or more groups of particles are determined to be the process target based on the received information on the process target; and generating dictionary data by applying a machine learning algorithm to the teaching data, wherein the dictionary data is used to control a sorting mechanism.

\* \* \* \* \*